United States Patent
Lim et al.

(10) Patent No.: US 10,439,868 B2
(45) Date of Patent: Oct. 8, 2019

(54) ELECTRONIC DEVICE EMPLOYING LEVEL-BASED TRANSMISSION OF CONFIGURATION INFORMATION

(71) Applicant: Samsung Electronics Co., Ltd., Gyeonggi-do (KR)

(72) Inventors: Jun-Hak Lim, Gyeonggi-do (KR); Hyuk Kang, Gyeonggi-do (KR); Su-Hyun Kim, Gyeonggi-do (KR); Ju-Ah Lee, Gyeonggi-do (KR); Young-Jae Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 175 days.

(21) Appl. No.: 15/054,732

(22) Filed: Feb. 26, 2016

(65) Prior Publication Data
US 2016/0254950 A1    Sep. 1, 2016

(30) Foreign Application Priority Data

Feb. 27, 2015    (KR) ........................ 10-2015-0027931

(51) Int. Cl.
| | |
|---|---|
| H04L 12/24 | (2006.01) |
| H04B 5/00 | (2006.01) |
| H04W 4/50 | (2018.01) |
| H04N 5/44 | (2011.01) |
| H04L 29/06 | (2006.01) |

(Continued)

(52) U.S. Cl.
CPC ........ *H04L 41/0803* (2013.01); *H04L 63/105* (2013.01); *H04N 5/4403* (2013.01); *H04W 4/50* (2018.02); *H04W 12/08* (2013.01); *G06F 2221/2113* (2013.01);

(Continued)

(58) Field of Classification Search
None
See application file for complete search history.

(56) References Cited

U.S. PATENT DOCUMENTS

| | | | |
|---|---|---|---|
| 7,373,411 B2 | 5/2008 | Robinson | |
| 8,161,275 B1 * | 4/2012 | Woodward | ........... H04N 21/426 713/1 |

(Continued)

FOREIGN PATENT DOCUMENTS

EP    2 816 865 A1    12/2014

OTHER PUBLICATIONS

International Search Report, dated Jun. 8, 2016.
European Search Report, dated Jun. 27, 2016.

*Primary Examiner* — Natisha D Cox
(74) *Attorney, Agent, or Firm* — Cha & Reiter, LLC.

(57) ABSTRACT

An electronic device for transmitting configuration information and an operation method thereof are provided. In various embodiments, an electronic device may receive a signal including information related to a media device, from the media device. The electronic device may identify configuration information usable for setting a configuration of the media device, in response to the signal. A level (such a security level or a priority level) of the configuration information may be identified. It may then be determined whether it is permissible for the configuration information to be transmitted to the media device, based on the identified level of the configuration information. If so, the configuration information may be transmitted to the media device.

15 Claims, 26 Drawing Sheets

(51) Int. Cl.
  *H04W 12/08* (2009.01)
  *H04W 4/80* (2018.01)
  *H04N 21/4363* (2011.01)
  *H04N 21/475* (2011.01)
(52) U.S. Cl.
  CPC ... *H04N 21/43637* (2013.01); *H04N 21/4755* (2013.01); *H04W 4/80* (2018.02)

(56) References Cited

U.S. PATENT DOCUMENTS

| | | | |
|---|---|---|---|
| 8,744,423 B2 | 6/2014 | Baribault et al. | |
| 8,965,269 B2 | 2/2015 | McClaughry et al. | |
| 2005/0209974 A1* | 9/2005 | Okunseinde | G06Q 20/382 705/64 |
| 2005/0227647 A1* | 10/2005 | Dorfman | H04B 1/0064 455/142 |
| 2006/0064589 A1 | 3/2006 | Taniguchi et al. | |
| 2006/0271562 A1* | 11/2006 | Kato | G06F 16/9535 |
| 2008/0165083 A1 | 7/2008 | Brodersen et al. | |
| 2009/0227274 A1* | 9/2009 | Adler | H04L 63/0272 455/466 |
| 2011/0320575 A1* | 12/2011 | Pope | H04N 21/8543 709/220 |
| 2013/0288601 A1 | 10/2013 | Chhabra | |
| 2014/0006569 A1 | 1/2014 | Ferrazzini et al. | |
| 2014/0359751 A1* | 12/2014 | Son | G06F 21/31 726/16 |
| 2014/0364056 A1* | 12/2014 | Belk | H04B 5/0031 455/41.1 |
| 2015/0009988 A1* | 1/2015 | Lim | H04L 47/2458 370/389 |
| 2015/0135336 A1* | 5/2015 | Arasavelli | H04B 7/26 726/29 |
| 2016/0055732 A1* | 2/2016 | Howard | G08B 21/0272 340/539.13 |
| 2017/0076522 A1* | 3/2017 | Ives-Halperin | G06Q 10/02 |

* cited by examiner

ELECTRONIC DEVICE EMPLOYING LEVEL-BASED TRANSMISSION OF CONFIGURATION INFORMATION

CLAIM OF PRIORITY

This application claims the benefit under 35 U.S.C. § 119(a) of a Korean patent application filed in the Korean Intellectual Property Office on Feb. 27, 2015 and assigned Serial No. 10-2015-0027931, the entire disclosure of which is incorporated herein by reference.

TECHNICAL FIELD

The present disclosure relates to an electronic device for transmitting and receiving configuration information and an operation method of the electronic device.

BACKGROUND

A consumer electronic device such as smart TV, a smartphone, a tablet, a wearable device, and the like may be designed to share content and/or information with other electronic devices via wireless communication, and provide the shared content and/or information to the user. Further, the user may configure (or set up/establish) an appropriate driving environment (or running environment) for each of the functions provided by the electronic devices. In this manner, a user device may receive a variety of content and/or information in a desired manner depending on the configured driving environment.

In the case where a first electronic device transmits different types of configuration information in the same manner in a process of delivering the configuration information to a second electronic device(s), a problem may occur with the security or the configuration operation of the second electronic device. In the case where high-security configuration information such as a user's private information or network environment information is transmitted without the user's approval procedure or the like, the high-security configuration information may be easily leaked to an unintended third party device. Further, in a case where configuration information is transmitted without considering any sort of priority of the configuration information, the second electronic device that has received the configuration information may experience a delay in a process of setting the configuration.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure may provide a configuration information transmission method and apparatus for solving the above-described problems or other problems.

In accordance with one aspect of the present disclosure, there is provided a method for operating an electronic device. The electronic device may receive a signal including information related to a media device, from the media device. The electronic device may identify configuration information usable for setting a configuration of the media device, in response to the signal. A level (such a security level or a priority level) of the configuration information may be identified. It may then be determined whether it is permissible for the configuration information to be transmitted to the media device, based on the identified level of the configuration information. If so, the configuration information may be transmitted to the media device.

In accordance with another aspect of the present disclosure, there is provided an electronic device that includes: a communication circuit; a processor operably coupled to the communication circuit; and a memory operably coupled to the processor. The memory includes instructions executable by the processor to: receive via the communication circuit a signal including information related to an external media device, from the media device; identify configuration information usable for configuring the media device, in response to the signal;

identify a level of the configuration information; and determine whether the configuration information is of a type permitted to be transmitted to the media device, based on the identified level of the configuration information, and if so, transmitting the configuration information to the media device.

In accordance with further another aspect of the present disclosure, there is provided a method for operating an electronic device such as a media device. The method includes broadcasting first and second signals, each including information related to the electronic device, through first and second communication modes, respectively; receiving configuration information, through the first or second communication modes, which has been determined to be transmittable in a manner based on a level thereof, from a mobile device that has received the first or second signal; and setting a configuration based at least in part on the configuration information.

In accordance with yet another aspect of the present disclosure, there is provided an electronic device, such as a media device, that includes a communication circuit; a processor operably coupled to the communication module; and a memory operably coupled to the processor. The memory may include instructions to allow the processor to: broadcast first and second signals, each including information related to the electronic device, through first and second communication modes, respectively; receive configuration information, through the first or second communication modes, which has been determined to be transmittable in a manner based on a level thereof, from a mobile device that has received the first or second signals; and set a configuration thereof based at least in part on the configuration information.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
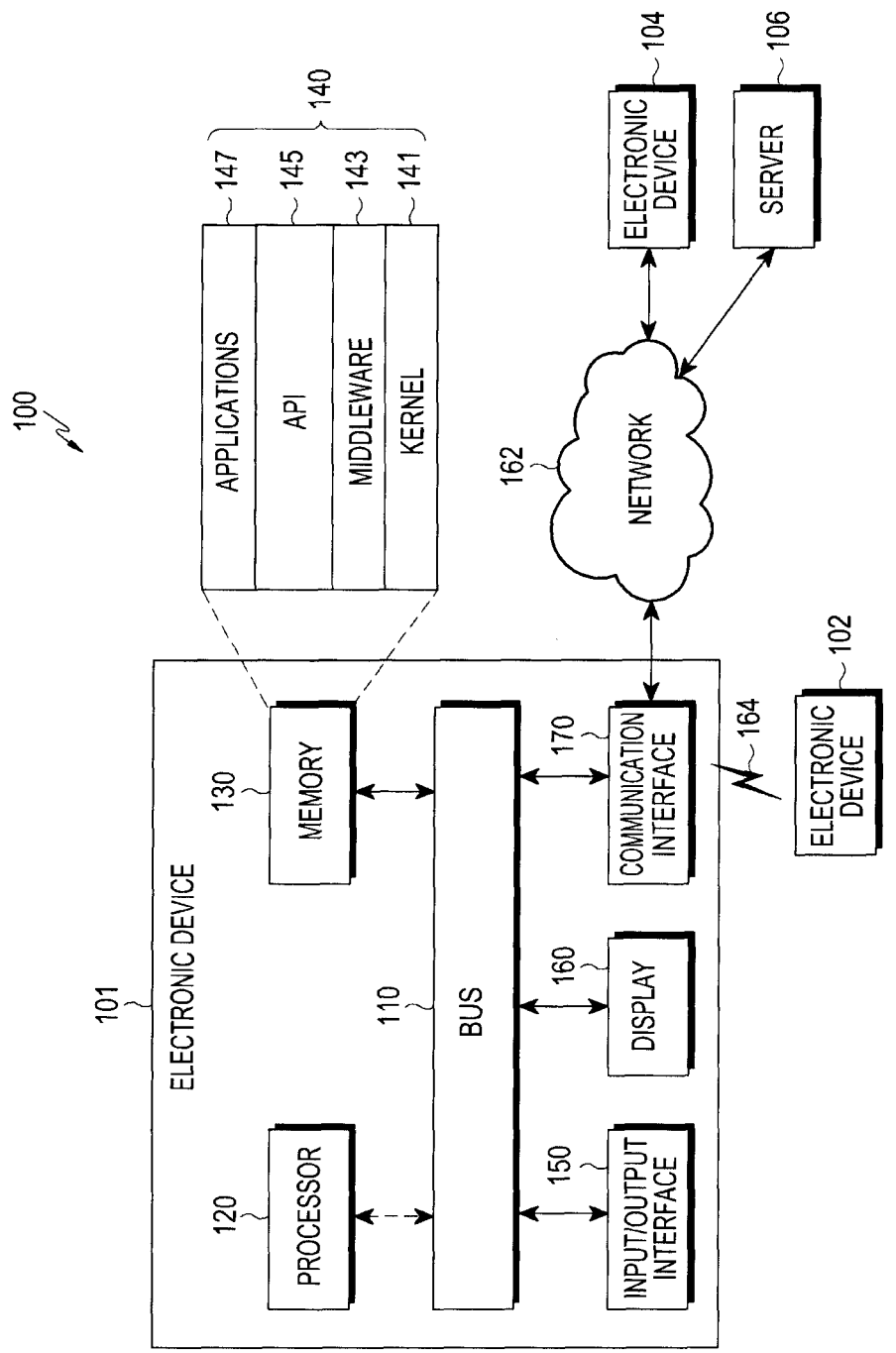
FIG. 1 illustrates a network environment including an electronic device according to various embodiments of the present disclosure.

Hereinafter, embodiments of the present disclosure are described with reference to the accompanying drawings.

Various changes may be made to the present disclosure, and the present disclosure may describe a diversity of embodiments. Some embodiments of the present disclosure are shown and described in connection with the drawings. However, it should be appreciated that the claimed subject matter is not limited to the disclosed embodiments, and all changes and/or equivalents or replacements thereto are also within to the scope of the claimed subject matter. The same or similar legends are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the", as used in this disclosure and the appended claims, encompass plural references unless the context clearly dictates otherwise.

Unless otherwise defined, all terms including technical and scientific terms used herein have the same meaning as commonly understood by one of ordinary skill in the art to which the embodiments of the present disclosure pertain.

Examples of an electronic device according to various embodiments of the present disclosure may include but are not limited to a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. In various embodiments, the wearable device may be an accessory-type wearable device (e.g., a watch, a ring, a bracelet, anklet, a necklace, glasses, contact lens or a head mounted device (HMD)), a fabric or garment-type wearable device (e.g., electronic clothing), a body-mounted wearable device (e.g., a skin pad or tattoo), or a bio-implantable wearable device.

In some embodiments, the electronic device may be a home appliance. Examples of the home appliance may include a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™ or a Google TV™), a game console (e.g., Xbox™ or PlayStation™), an electronic dictionary, an electronic key, a camcorder or a digital photo frame.

In another embodiment, the electronic device may be at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or household robot, an automatic teller's machine (ATM) for banks, point of sales (POS) for shops, or an internet of things (IoT) device (e.g., an electronic bulb, various sensors, an electricity or gas meter, a sprinkler device, a fire alarm, a thermostat, a streetlamp, a toaster, fitness equipment, a hot-water tank, a heater, a boiler or the like).

In some embodiments, the electronic device may be at least one of a part of the furniture or building/structure, an electronic board, an electronic signature receiving device, a projector, or various meters (e.g., meters for water, electricity, gas or radio waves). In various embodiments, the electronic device may be one or a combination of the above-described various devices. An electronic device according to some embodiments may be a flexible electronic device. An electronic device according to an embodiment of the present disclosure will not be limited to the above-described devices, and may include a new electronic device that is provided by the development of technology.

Hereafter, embodiments of methods and devices are described in which configuration information of at least one type or instance may be transmitted from a first electronic device to a media device or second electronic device. For convenience of description, reference will be made to "configuration information" which is intended to encompass one or more types or instances of configuration information. Similarly, a "signal" transmitted by a media device as described herein may be one or plural signals. In the case of plural signals, each signal may be transmitted via a different communication scheme.

Hereafter, an electronic device according to various embodiments of the present disclosure will be described with reference to the accompanying drawings. As used herein, the term 'user' may refer to a person who uses the electronic device, or a device (e.g., an intelligent electronic device) that uses the electronic device.

FIG. 1 illustrates a block diagram of an electronic device 101, and a network environment 100 including electronic device 101, in various embodiments. The electronic device 101 may include a bus 110, a processor 120, a memory 130, an input/output (I/O) interface 150, a display 160, and a communication interface 170. In some embodiments, the electronic device 101 may exclude any one of the components, or may further include other components. Electronic device 101 may be a device that provides configuration information to a media device to enable the media device to set its configuration. The media device itself is another example of electronic device 101 (or electronic device 102 or 104).

The bus 110 may include, for example, a circuit that connects the components 110 to 170 to each other, and transfers the communication (e.g., a control message and/or data) between the components 110 to 170.

The processor 120 may include one or more of a central processing unit (CPU), an application processor (AP) or a communication processor (CP). The processor 120 may execute, for example, a control and/or communication-related operation or data processing for at least one other component of the electronic device 101.

The memory 130 may include a volatile and/or non-volatile memory. The memory 130 may store, for example, a command or data related to at least one other component of the electronic device 101. In one embodiment, the memory 130 may store software and/or a program 140. The program 140 may include, for example, a kernel 141, a middleware 143, an application programming interface (API) 145, and/or an application program (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141.

Further, the middleware 143 may process one or more work requests received from the application program(s) 147 according to their priority. For example, the middleware 143 may assign a priority capable of using the system resources (e.g., the bus 110, the processor 120, the memory 130 or the like) of the electronic device 101 to at least one of the application programs 147. For example, the middleware 143 may perform scheduling or load balancing for the one or more work requests by processing the one or more work requests according to the priority assigned to at least one of the application programs 147.

The API 145 is, for example, an interface by which the application 147 controls the function provided in the kernel 141 or the middleware 143, and may include at least one interface or function (e.g., a command) for, for example, file control, window control, image processing or character control.

The I/O interface 150 may, for example, serve as an interface that can transfer a command or data received from the user or other external device to the other component(s) of the electronic device 101. Further, the I/O interface 150 may output a command or data received from the other component(s) of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by using, for example, an electronic pen or a part of the user's body.

The communication interface 170 may, for example, establish communication between the electronic device 101 and an external device (e.g., a first external electronic device 102, a second external electronic device 104 or a server 106). For example, the communication interface 170 may communicate with the external device (e.g., the second external electronic device 104 or the server 106) by being connected to a network 162 via wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. Further, the wireless communication may include, for example, wireless communication 164. The wireless communication 164 may include at least one of, for example, wireless fidelity (WiFi), Bluetooth, near field communication (NFC), or global navigation satellite system (GNSS). The GNSS may include at least one of, for example, a global positioning system (GPS), global navigation satellite system (Glonass), Beidou navigation satellite system (hereinafter, referred to as 'Beidou') or Galileo, and the European global satellite-based navigation system, depending on its use area or bandwidth. As used herein, the term "GPS" may be interchangeably used with the term "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet or the telephone network.

Each of the first and second external electronic devices 102 and 104 may be a device that is the same as or different from the electronic device 101. In one embodiment, the server 106 may include a group of one or more servers. In various embodiments, all or some of the operations executed in the electronic device 101 may be executed in one or multiple other electronic devices (e.g., the electronic devices 102 and 104 or the server 106). In one embodiment, if the electronic device 101 should perform a certain function or service automatically or upon request, the electronic device 101 may request at least some of the functions related thereto from other electronic devices (e.g., the electronic devices 102 and 104 or the server 106), instead of or in addition to spontaneously executing the function or service. The other electronic devices (e.g., the electronic devices 102 and 104 or the server 106) may execute the requested function or additional function, and deliver the results to the electronic device 101. The electronic device 101 may process the received results intact or additionally, thereby providing the requested function or service. To this end, for example, the cloud computing, distributed computing, or client-server computing technology may be used.

The processor 120 may process at least some of the information obtained from other components (e.g., at least one of the memory 130, the I/O interface 150 and/or the communication interface 170), and use the processed information in many different ways. For example, the processor 120 may control at least some functions of the electronic device 101 so that the electronic device 101 may interwork with other electronic devices (e.g., the electronic devices 102 and 104 or the server 106). The processor 120 may be incorporated into the communication interface 170. In one embodiment, at least one configuration of the processor 120 may be included in the server 106, and at least one operation implemented in the processor 120 may be supported from the server 106.

In one embodiment, the memory 130 may include instructions to operate the processor 120. For example, the memory 130 may include instructions to allow the processor 120 to control other components of the electronic device 101 and interwork with other electronic devices 102 and 104 or the server 106. The processor 120 may control other components of the electronic device 101 and interwork with the other electronic devices 102 and 104 or the server 106, based on the instructions stored in the memory 130. Herein, an operation of the electronic device 101 will be described as an entity of each of the components of the electronic device 101. Further, instructions to perform an operation by each of the components may be included in the memory 130.

The communication interface 170 according to various embodiments of the present disclosure may receive at least one signal including information related to a media device from the media device (which is external to the electronic device 101). The media device may be an electronic device that provides audio and/or video content and the like. The media device may broadcast a signal(s) including the information related to the media device through a single or multiple (different) communication modes. The communication interface 170 may receive the signal(s) including the information related to the media device through each communication mode.

The media device may broadcast a signal including information related to the media device through wireless communication (e.g., Bluetooth, WiFi, ANT and the like). Further, the media device may broadcast a signal including information related to the media device, using (alternatively or additionally to wireless communication) at least one of sound-based communication, visual signal-based communication (e.g., light emitting signal, quick response (QR) code, vision signal and the like), and smell-based communication (smell beacon). The media device may also transmit the signal to the electronic device 101 at the request of the electronic device 101.

The information related to the media device may include at least one of information about a configuration state of the media device, information about an operating state of the media device and device information of the media device.

For example, the information about a configuration state of the media device may include information indicating (i) whether the media device is in an initial configuration state in which the configuration is not set, (ii) whether the configuration is initialized as the media device is reset, and (iii) whether the configuration is settable based on information/control signals to be provided by an external device (e.g. electronic device 101). The information about an operating state of the media device may include information indicating whether the media device is now in a turn-on or turn-off state. Further, the device information of the media device may include information about a device name of the media device, and information about the capability of the media device. The above-described state information of the media device is a mere example for the purpose of description, but the state information is not limited thereto. The state information of the media device may include information that should be provided for reception of configuration information to be used to set the configuration of the media device.

The processor 120 may identify configuration information to be used to set the configuration of the media device in response to the signal. The processor 120 may identify configuration information to be used to configure the media device among plural types or instances of configuration information included in the memory 130 of the electronic device 101.

The configuration information may include language configuration information, audio configuration information, video configuration information, network configuration information, content region configuration information, and/or account information.

For example, the language configuration information may be configuration information about the language provided in the media device. The audio configuration information and the video configuration information may be configuration information used to provide the audio and/or video content provided in the media device. Further, the network configuration information may be configuration information used to configure the network environment of the media device. The content region configuration information may be configuration information used to select the content provided depending on the region. In addition, the account information may be configuration information about an account registered in the server for interworking with other electronic devices.

The above-described configuration information is a mere example for the purpose of description, but it is not limited thereto. The configuration information may include configuration information available for configuration of the media device. Further, the type of the configuration information may be preset depending on the media device, and may also be set as the type of the configuration information used for a configuration of the electronic device 101.

The processor 120 may identify a level of the configuration information. For each type or instance of configuration information, its level may be set depending on preset criteria. The processor 120 may differentially manage and transmit types or instances of the configuration information depending on the level that is set in each type/instance of the configuration information depending on the preset criteria, instead of managing and transmitting all of the configuration information in the same way.

The level may be determined in response to each type/instance of the configuration information depending on a variety of criteria that can be set in advance. For example, in a case where a priority level at which the level is determined depending on the priority of the configuration information is the criteria, high-priority configuration information among the configuration information may be determined as a high level, and low-priority configuration information may be determined as a low level. As such, the level may be determined for each configuration information based on of the priority level, an urgency level at which the level is determined depending on the urgency level of the configuration information, a security level at which the level is determined depending on the security level of the configuration information, a data size level at which the level is determined depending on the data size of the configuration information, and a user defined level at which the level is determined depending on the user defined level for the configuration information.

The criteria for setting the levels are a mere example for the purpose of description, but they are not limited thereto. In order to differentially manage and transmit each of the configuration information, the level may be determined depending on a variety of criteria that can be set in advance.

Processor 120 may determine whether the configuration information is permitted to be transmitted to the media device, based on the identified level of the configuration information. If plural types/instances of configuration information is available, processor 120 may make this determination for each type/instance of configuration information. The processor 120 may determine whether the configuration information is permitted to be transmitted to the media device differently for each level, based on the identified level of the each type/instance of configuration information.

The processor 120 may transmit the configuration information determined to be transmittable (i.e., permitted to be transmitted) among plural types/instances of configuration information to the media device, hereafter referred to as "permitted configuration information". The processor 120 may transmit just the permitted configuration information to the media device, instead of transmitting all configuration information available which could otherwise be used to set the configuration of the media device. Through this, the user may determine and control the transmission of high-priority configuration information, high-urgency level configuration information, and high-security level configuration information to the media device. Processor 120 may identify a level of the configuration information based on the information related to a media device, which is included in the signal. The processor 120 may identify the contents included in the information related to the media device, and identify a level of the configuration information based on the identified contents.

The processor 120 may determine whether each received signal is valid. This may be done using relatively simple criteria. Using this determination, processor 120 may identify a level of the configuration information based on whether each received signal is valid.

In one embodiment, if a signal received through a first communication mode is valid, the processor 120 may identify first configuration information corresponding to a first level in configuration information to be used for configuration of the media device, which is identified in response to the signal. Further, if first and second signals received through first and second communication modes are valid, the processor 120 may identify second configuration information corresponding to a second level among plural types/instances of configuration information. As such, the processor 120 may identify a level of configuration information depending on whether only one, or each, of the received signals is valid.

In one embodiment, if a first signal received through the first communication mode is valid, the processor 120 may designate a first level to configuration information that is identified based on the first signal. Further, if the first and second signals received through the first and second communication modes are valid, the processor 120 may designate a second level to configuration information that is determined in common based on each of the first and second signals. As such, the processor 120 may determine whether each receive signal is valid, and identify a level of configuration information based on the information related to a media device, which is included in the valid signal.

Processor 120 may alternatively identify a level of the configuration information based on characteristics of the signal. The characteristics of the signal may include at least one of signal strength, signal quality, a signal-to-noise ratio (SNR), an error rate, a direction, frequency characteristics, modulation characteristics, a channel, a band and a bandwidth. Other characteristics by which a signal can be identified, may also/alternatively be used.

For example, the processor 120 may designate a first level to configuration information determined based on the information related to a media device, which is included in a signal whose signal strength is greater than or equal to a first value. Further, the second processor 120 may designate a second level to configuration information determined based on the information related to a media device, which is included in a signal whose signal strength is greater than or equal to a second value greater than the first value.

Processor 120 may identify, among available configuration information, first configuration information corresponding to a first level at which it is not required to separately determine whether the transmission is permitted. The first configuration information may be determined to be transmittable. For example, if the criteria for determining a level are the security level, low-security level configuration information like the language configuration information may not require a separate user's check in order to be transmitted to the media device. In this case, the language configuration information may be determined as a first level based on the security level, and first configuration information corresponding to the first level may be determined to be transmittable without a separate operation.

In various embodiments, the processor 120 may identify, among available configuration information, second configuration information corresponding to a second level at which it is determined based on a user's approval that the transmission is permitted. If the user's approval is obtained, the processor 120 may determine the second configuration information to be transmittable. For example, in a case where a criterion for determining a level is the security level, the security level may be set high, if a password for network access like the network configuration information is required. In this case, based on the security level, the network configuration information may be determined as a second level, and second configuration information corresponding to the second level may not be determined to be transmittable unless the user's approval is obtained.

In various embodiments, the processor 120 may identify, among available configuration information, third configuration information corresponding to a third level at which it is determined based on a preset password that the transmission is possible. If the password is obtained, the processor 120 may determine the third configuration information to be transmittable. For example, in a case where a criterion for determining a level is the security level, the security level may be set as the highest level, if the user's information is required for account configuration, like account configuration information. In this case, based on the security level, the account configuration information may be determined as a third level, and third configuration information corresponding to the third level may not be determined to be transmittable unless the preset password is obtained.

In one embodiment, the password may be set differently for each type of the third configuration information. For example, if the third configuration information is account configuration information, the preset password may be an 8-digit password. However, if the third configuration information is configuration information related to the user's financial transactions, the preset password may be a 16-digit password. As such, the password may be set differently depending on the security level, priority level and urgency level for each type of the third configuration information.

As described above, the method of determining whether the transmission is permissible may be set differently depending on each level. However, the fact that the level is divided into three steps and the method of determining whether the transmission is possible depending on each level may be a mere example for the purpose of description, but other options are available. It will be apparent to those skilled in the art that the level can be subdivided depending on the level setting criteria and various methods of determining whether the transmission is permitted depending on each level can be applied.

In various embodiments, the processor 120 may transmit the configuration information determined to be transmittable to the media device through a personal server connected to the electronic device 101 and the media device. The personal server may be a server that manages a home network including the electronic device and the media device. For example, the personal server may be a home server that controls or manages various electronic devices such as a smart TV, a smartphone and an audio device, which are included in the home network.

In one embodiment, the personal server may transmit configuration information of other electronic devices connected to the personal server to the media device. For example, when receiving the configuration information from the electronic device 101 and delivering the received configuration information to the media device, the personal server may also transmit configuration information provided by a notebook computer, a PC, an audio device and the like, which are connected to the personal server, to the media device. As such, the media device may also receive configuration information of not only the electronic device but also other electronic devices, and set its configuration using the received configuration information. [김태상]

In various embodiments, the processor 120 may select a communication mode for transmitting the permitted configuration information based on the identified level of the configuration information. Further, the processor 120 may transmit the permitted configuration information to the media device through the selected communication mode. As such, the processor 120 may select a different communication mode depending on the identified level, and transmit the configuration information to the media device through the selected communication mode.

In various embodiments, the processor 120 may select at least one of broadcast, multicast and unicast based on the identified level. Further, the processor 120 may select one of a non-security channel or a security channel based on the identified level, and the processor 120 may select one of a non-pairing mode or a pairing mode based on the identified level. For example, the non-pairing mode may be a scheme in which the electronic device 101 does not perform pairing with a specific electronic device and performs communications with unknown devices. In addition, the processor 120 may select one of synchronous communication or asynchronous communication.

In various embodiments, the processor 120 may select a communication mode for transmitting the permitted configuration information through at least one of the schemes for selecting the communication modes. As such, the processor 120 may determine whether the transmission is permitted differently for each of the identified level, and may select a communication mode differently for each of the identified levels to transmit the configuration information to the media device.

In various embodiments, the processor 120 may determine a sub-module of the media device that has transmitted each signal. For example, the processor 120 may determine the sub-module based on the information included in each signal, and may also determine the sub-module using the signal characteristics for each signal.

For example, it will be assumed that a first signal is a signal transmitted from a first sub-module and a second signal is a signal transmitted from a second sub-module. In this case, the first signal may include information indicating the signal transmitted from the first sub-module, and the second signal may include information indicating the signal transmitted from the second sub-module. Upon receiving the first and second signals, the processor 120 may determine based on the information included in the first and second signals that the first signal is a signal transmitted from the first sub-module and the second signal is a signal transmitted from the second sub-module.

Further, if the first and second signals are different from each other in terms of the signal characteristics, the processor 120 may determine a sub-module that has transmitted the signal, using the signal characteristics of the received signals. The processor 120 may obtain in advance the information about the signal characteristics of the signal transmitted by each of the sub-modules, from the media device. The processor 120 may compare the pre-obtained information about the signal characteristics with the signal characteristics of the first and second signals, and determine each of the sub-modules that have transmitted the first and second signals, based on the result of the comparison. It is noted that other options may be available for determining the sub-module based on the received signal.

In various embodiments, the processor 120 may identify a level of the configuration information based on the determined sub-module. In one embodiment, a level corresponding to each sub-module may be set in advance. For example, the first sub-module may be set to correspond to the first level, and the second sub-module may be set to correspond to the second level. As such, the level corresponding to each sub-module may be set in advance depending on the characteristics of the sub-module and the user's settings.

For example, it will be assumed that the first sub-module is set to correspond to the first level and the second sub-module is set to correspond to the second level. If the processor 120 has determined that the sub-module that has transmitted the received first signal is the first sub-module, the processor 120 may determine first configuration information corresponding to the first level in configuration information to be used for configuration of the media device, which is determined based on the first signal. Further, if the processor 120 has determined that the sub-module that has transmitted the received second signal is the second sub-module, the processor 120 may determine second configuration information corresponding to the second level in configuration information to be used for configuration of the media device, which is determined based on the second signal. As such, the processor 120 may identify configuration information corresponding to a level of configuration information based on the determined sub-module.

Figure 2:
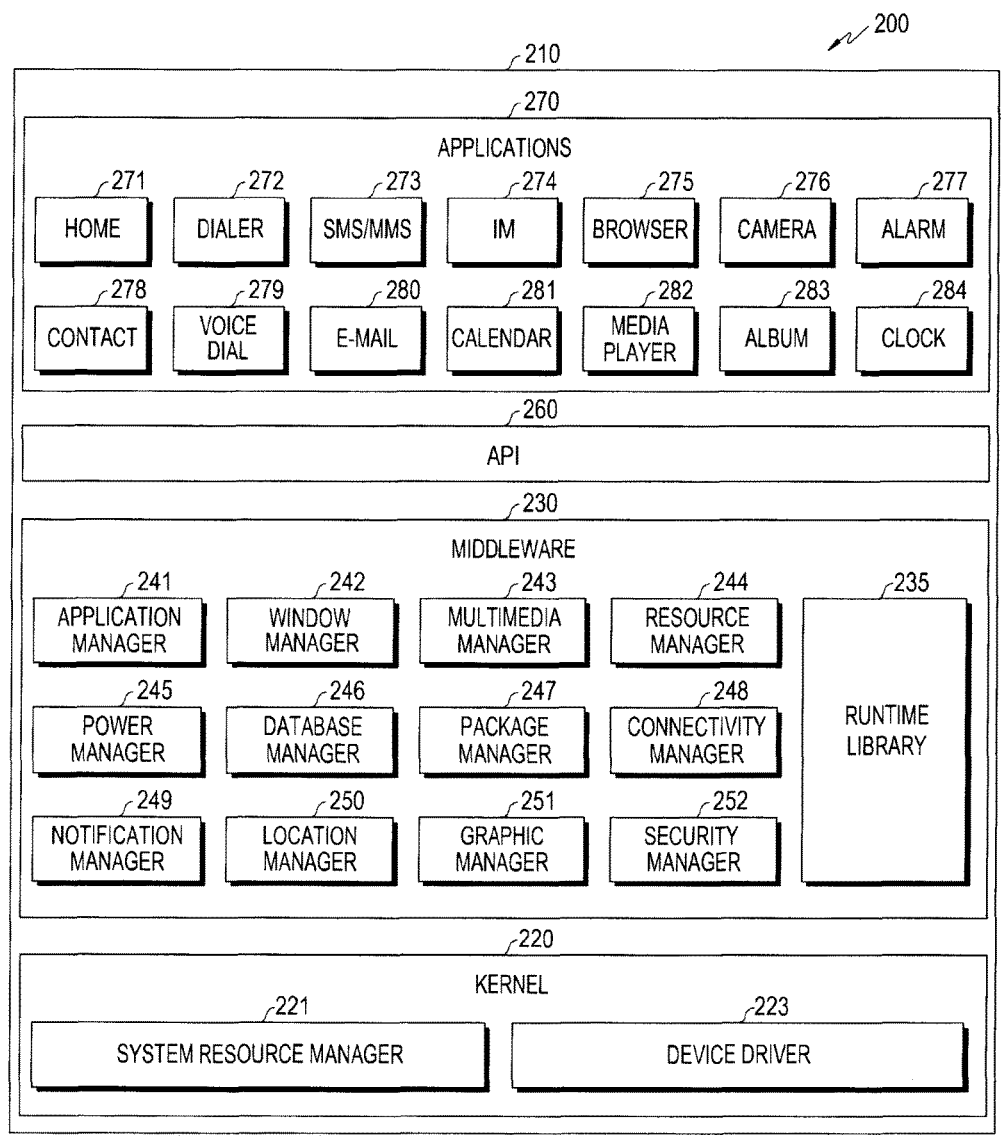
FIG. 2 is a block diagram of a program module according to various embodiments of the present disclosure.

FIG. 2 is a block diagram of a program module according to various embodiments of the present disclosure. In one embodiment, a program module 210 (e.g., the program 140) may include an operating system (OS) for controlling the resources related to an electronic device (e.g., the electronic device 101), and/or a variety of applications (e.g., the application program 147) that run on the operating system. The operating system may be, for example, Android™, iOS™, Windows™, Symbian™, Tizen™, Bada™ or the like.

The program module 210 may include a kernel 220, a middleware 230, an API 260, and/or an application(s) 270. At least a part of the program module 210 may be preloaded on the electronic device, or downloaded from an external electronic device (e.g., the electronic devices 102 and 104, or the server 106).

The kernel 220 (e.g., the kernel 141) may include, for example, a system resource manager 221 and/or a device driver 223. The system resource manager 221 may control, allocate or recover the system resources. In one embodiment, the system resource manager 221 may include a process manager, a memory manager, a file system manager or the like. The device driver 223 may include, for example, a display driver, a camera driver, a Bluetooth driver, a shared memory driver, a USB driver, a keypad driver, a WiFi driver, an audio driver, or an inter-process communication (IPC) driver.

The middleware 230, for example, may provide a function that is required in common by the application(s) 270, or may provide various functions to the application 270 through the API 260 so that the application 270 may efficiently use the limited system resources within the electronic device. In one embodiment, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include, for example, a library module that a compiler uses to add a new function through a programming language while the application 270 is run. The runtime library 235 may perform an I/O management function, a memory management function, an arithmetic function or the like.

The application manager 241 may, for example, manage the life cycle of at least one of the application(s) 270. The window manager 242 may manage graphic user interface (GUI) resources that are used on the screen. The multimedia manager 243 may determine the format required for playback of various media files, and encode or decode the media files using a codec for the format. The resource manager 244 may manage resources such as a source code, a memory or a storage space for any one of the application(s) 270.

The power manager 245 may manage the battery or power by operating with, for example, the basic input/output system (BIOS), and provide power information required for an operation of the electronic device. The database manager 246 may create, search or update the database that is to be used by at least one of the application(s) 270. The package manager 247 may manage installation or update of applications that are distributed in the form of a package file.

The connectivity manager 248 may manage wireless connection such as, for example, WiFi or Bluetooth. The notification manager 249 may display or notify evens such as message arrival, appointments and proximity in a manner that doesn't interfere with the user. The location manager 250 may manage the location information of the electronic device. The graphic manager 251 may manage the graphic effect to be provided to the user, or the user interface related thereto. The security manager 252 may provide various security functions required for the system security or user authentication. In one embodiment, if the electronic device (e.g., the electronic device 101) includes a phone function, the middleware 230 may further include a telephony manager for managing the voice or video call function of the electronic device.

The middleware 230 may include a middleware module that forms a combination of various functions of the above-described components. The middleware 230 may provide a module specialized for the type of the operating system in order to provide a differentiated function. Further, the middleware 230 may dynamically remove some of the existing components, or add new components.

The API 260 (e.g., the API 145) is a set of, for example, API programming functions, and may be provided in a different configuration depending on the operating system. For example, for Android™ or iOS™, the API 260 may provide one API set per platform, and for Tizen™, the API 260 may provide two or more API sets per platform.

The application 270 (e.g., the application program 147) may include, for example, one or more applications capable of performing functions such as a home 271, a dialer 272, a short message service/multimedia messaging service (SMS/MMS) 273, an instant message (IM) 274, a browser 275, a camera 276, an alarm 277, a contact 278, a voice dial 279, an Email 280, a calendar 281, a media player 282, an album 283, a clock 284, healthcare (e.g., for measuring the quantity of exercise, the blood glucose or the like), or environmental information provision (e.g., for providing information about the atmospheric pressure, the humidity, temperature or the like).

In one embodiment, the application 270 may include an application (hereinafter, referred to as an 'information exchange application' for convenience of description) for supporting information exchange between the electronic device (e.g., the electronic device 101) and external electronic devices (e.g., the electronic devices 102 and 104). The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the electronic devices 102 and 104). Further, the notification relay application may, for example, receive notification information from an external electronic device, and provide the received notification information to the user.

The device management application may, for example, manage at least one function (e.g., a function of adjusting the turn-on/off of the external electronic device itself (or some components thereof) or the brightness (or the resolution) of the display) of the external electronic device (e.g., the electronic devices 102 and 104) communicating with the electronic device, and may manage (e.g., install, delete or update) an application operating in the external electronic device or a service (e.g., a call service or a messaging service) provided in the external electronic device.

In one embodiment, the application 270 may include an application (e.g., a healthcare application) that is specified depending on the attributes (e.g., the attributes of an electronic device, the type of which is a mobile medical device) of the external electronic device (e.g., the electronic devices 102 and 104). In one embodiment, the application 270 may include an application received or downloaded from the external electronic device (e.g., the server 106 or the electronic devices 102 and 104). In one embodiment, the application 270 may include a preloaded application or a third party application that can be downloaded from the server. The names of the components of the shown program module 210 may vary depending on the type of the operating system.

In various embodiments, at least a part of the program module 210 may be implemented by software, firmware, hardware or a combination thereof. At least a part of the program module 210 may be implemented (e.g., executed) by, for example, a processor (e.g., the AP). At least a part of the program module 210 may include, for example, a module, a program, a routine, an instruction set or a processor, for performing one or more functions.

Figure 3:
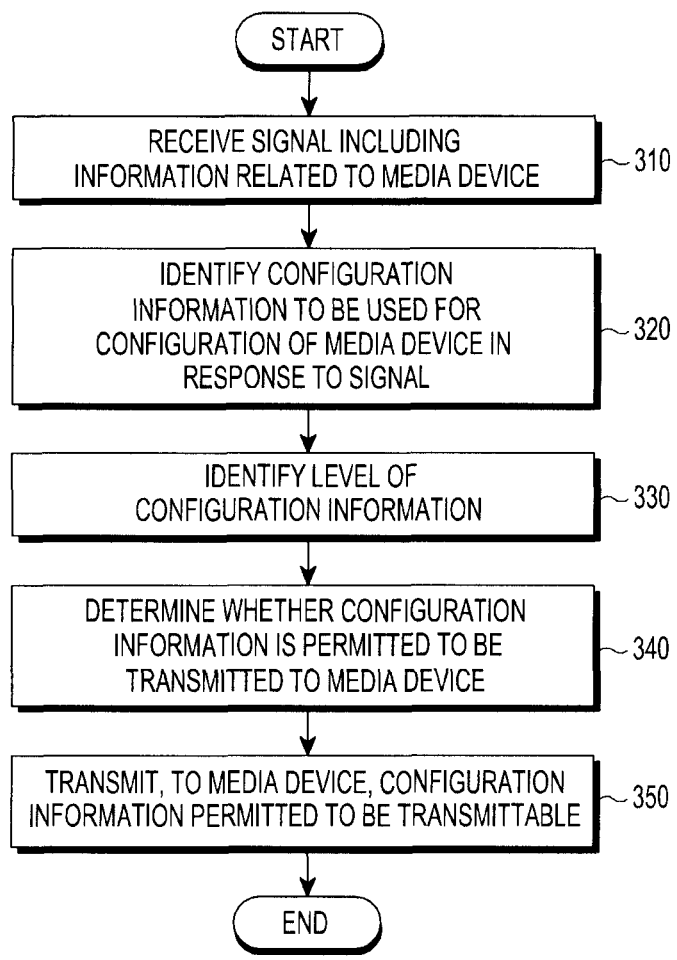
FIG. 3 is a flowchart of a configuration information transmission method by an electronic device according to various embodiments of the present disclosure.

FIG. 3 is a flowchart of a configuration information transmission method by an electronic device according to various embodiments of the present disclosure.

In operation 310, the electronic device 101 may receive a signal(s) including information related to a media device. If a signal including such information is transmitted via different communication modes, device 101 may receive the signal through each of the communication modes.

Prior to operation 310, a discovery operation for wireless communication may be performed between the electronic device 101 and the media device. The electronic device 101 may perform an operation of continuously scanning connectable devices through wireless communication. The media device may be discovered as a wireless communication-enabled device by the electronic device 101 through the scanning operation. Through this operation, the electronic device 101 may store the information that can be used to perform wireless communication with the media device. Further, the discovery operation for wireless communication may also be performed by the media device.

In operation 320, the electronic device 101 may identify configuration information to be used to set the configuration of the media device in response to the signal. This configuration information may be identified and retrieved from the memory 130. Further, the electronic device 101 may request, from a server, configuration information available for setting the media device, and receive the configuration information from the server in response to the request.

In operation 330, the electronic device 101 may identify a level of the configuration information. The electronic device 101 may differentially manage and transmit different types/instances of configuration information depending on the level that is set in each type/instance of the configuration information depending on preset criteria, instead of managing and transmitting all of the configuration information in the same way.

As mentioned earlier, the electronic device 101 may identify a level of the configuration information based on the signal received from the media device, whether the signal is valid, and characteristics of the signal. Further, the electronic device 101 may determine a sub-module of the media device that has transmitted the signal, and may identify a level of the configuration information based on the determined sub-module.

The level may be determined in association with each type of the configuration information depending on a variety of preset criteria in order to differentially manage or transmit each type of configuration information.

In operation 340, the electronic device 101 may determine whether the configuration information is permitted to be transmitted to the media device respectively, based on the identified level of the configuration information. The electronic device 101 may determine whether the configuration information is permitted to be transmitted to the media device differently for each level.

In operation 350, the electronic device 101 may transmit the configuration information determined to be transmittable (the permitted configuration information) among the available configuration information, to the media device. The electronic device 101 may transmit the permitted configuration information to the media device, instead of transmitting, to the media device, all available configuration information usable for setting the configuration of the media device.

Figure 4A:
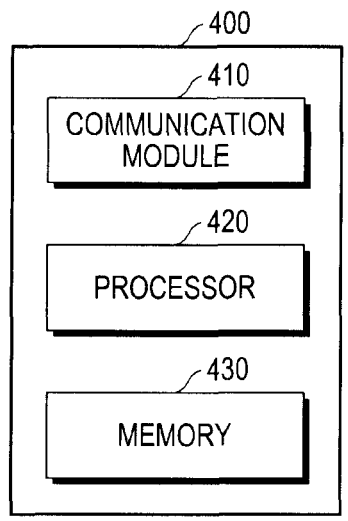
FIG. 4A is a block diagram of a media device according to various embodiments of the present disclosure.
Figure 4B:
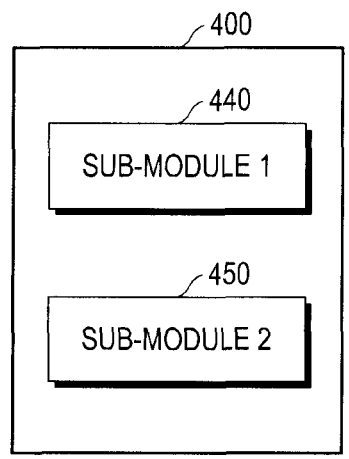
FIG. 4B is a block diagram of a media device according to various embodiments of the present disclosure.

FIGS. 4A and 4B are block diagrams showing example components of a media device according to various embodiments of the present disclosure.

Referring to FIG. 4A, a media device 400 may include a communication module 410, a processor 420 and a memory 430. The memory 430 may include instructions to allow the processor 420 to operate. For example, the memory 430 may include instructions to allow the processor 420 to control other components of the media device 400, and to interwork with other electronic devices. The processor 420 may control other components of the media device 400 and interwork with other electronic devices, based on the instructions stored in the memory 430. In the following description, an operation of the media device 400 will be assumed to be performed by each of the components of the media device 400. Further, the instructions to perform operations by the components may be included in the memory 430.

In various embodiments, the communication module 410 may broadcast a signal(s) including information related to the media device 400 through each of different communication modes. The communication module 410 may broadcast the information related to a media device using at least one communication mode among wireless communication, sound-based communication, visual signal-based communication and smell-based communication. Each signal may include information related to the same media device, and may include information related to different media devices depending, on the informational design of the signal.

In one embodiment, the information related to the media device 400 may include at least one of information about a configuration state of the media device 400, information about an operating state of the media device 400 and device information of the media device 400.

The communication module 410 according to various embodiments of the present disclosure may receive configuration information that is determined to be transmittable differently for each level, from an electronic device 101 that has received the signal. (As described above, electronic device 101 may identify a level for each configuration information based on the signal, whether the signal is valid, and characteristics of the signal. Further, the electronic device 101 may determine a sub-module of the media device 400 that has transmitted each of the signal, and may identify a level for each of the configuration information based on the determined sub-module. In addition, the electronic device 101 may determine whether it is permissible to transmit each type of configuration information differently for each of the identified levels.)

The processor 420 may set the configuration of media device 400 based on the configuration information. The processor 420 may identify configuration information available to set the configuration of the media device 400, in the received configuration information. Since the received configuration information can include information unavailable for configuration of the media device 400, the processor 420 may determine whether the received configuration information is available for configuring the media device.

Since the processor 420 may set the configuration of media device 400 as described above, the processor 420 may automatically set the configuration of the media device 400, even though the configuration is not directly set by the user in the configuration process.

In various embodiments, the communication module 410 may receive the configuration information through a personal server connected to the electronic device 101 and the media device 400. The personal server may transmit configuration information provided by another electronic device connected to the personal server to the media device 400. The processor 420 may identify configuration information available for setting the configuration of the media device 400, in the received configuration information of another electronic device. The processor 420 may set the configuration based on the determined available configuration information.

In various embodiments, the processor 420 may perform or make a connection to a personal server connected to the electronic device 101 and the media device 400 based on the configuration information. For example, if the received configuration information includes information for a connection to the personal server, then the processor 420 may make a connection to the personal server using the information for a connection to the personal server. Further, the communication module 410 may receive configuration information provided by another electronic device connected to the personal server, from the personal server.

In various embodiments, the processor 420 may identify configuration information available for configuration of the media device 400, in the received configuration information originating from another electronic device. The processor 420 may set the configuration of the media device 400 using the determined available configuration information.

Referring to FIG. 4B, the media device 400 according to various embodiments may include a first sub-module 440 and a second sub-module 450. Each of the first sub-module 440 and the second sub-module 450 may include at least one of a separate communication module, a processor and a memory.

The communication module included in each of the first and second sub-modules 440 and 450 may perform at least a portion of the function of the communication module 410 described in FIG. 4A, and may directly communicate with an external electronic device and/or may communicate with the external electronic device via at least one of the communication module 410 and a communication module included in another sub-module. Further, the communication module may communicate with the communication module 410 and the communication module included in another sub-module.

In various embodiments, the first and second sub-modules 440 and 450 may broadcast first and second signals including information related to the media device 400, respectively. As described above, the first and second sub-modules 440 and 450 may broadcast the first and second signals directly to the outside, and/or may broadcast the first and second signals via at least one of the communication module 410 and a communication module included in another sub-module.

In one embodiment, the first and second signals may further include information about a sub-module that broadcasts each of the first and second signals. For example, the first signal may include information indicating that the first signal is a signal transmitted from the first sub-module 440, and the second signal may include information indicating that the second signal is a signal transmitted from the second sub-module 450.

In one embodiment, the first and second signals may have different signal characteristics. For example, the first and second signals may be different from each other in terms of at least one of signal strength, signal quality, SNR, an error rate, a direction, frequency characteristics, modulation characteristics, a channel, a band and a bandwidth.

Further, the media device 400 may transmit, to the electronic device 101, information about each of the signal characteristics broadcasted by the first and second sub-modules 440 and 450. The information about each of the signal characteristics may be used by the electronic device 101 in determining each of the first and second sub-modules 440 and 450 using the signal characteristics of the first and second signals.

In various embodiments of the present disclosure, the processor included in each of the first and second sub-modules 440 and 450 may perform at least a portion of the function of the processor 420 described in FIG. 4A, and may use the resources of the processor 420 and a processor included in another sub-module.

In various embodiments of the present disclosure, a memory included in each of the first and second sub-modules 440 and 450 may perform at least a portion of the function of the memory 430 described in FIG. 4A.

Figure 5:
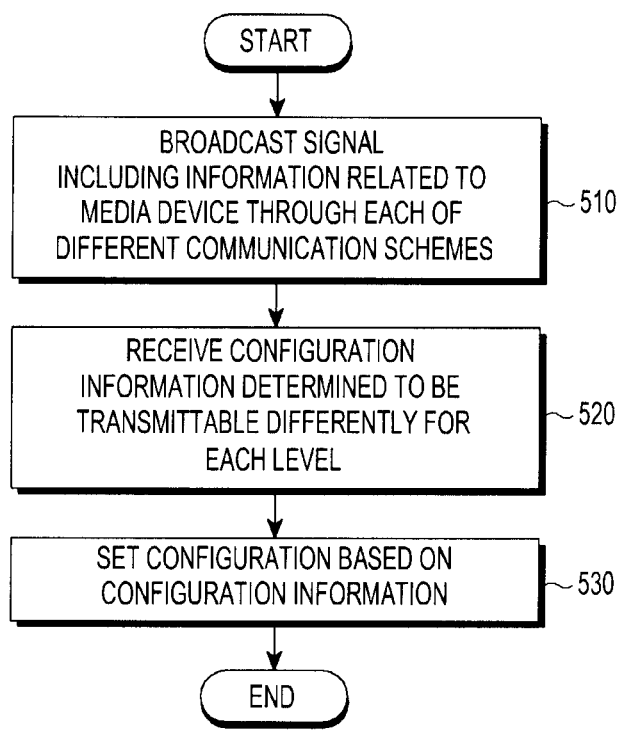
FIG. 5 is a flowchart of a configuration method by a media device according to various embodiments of the present disclosure.

FIG. 5 is a flowchart of a configuration method by a media device according to various embodiments of the present disclosure.

In operation 510, the media device 400 may broadcast a signal(s) including information related to the media device 400 through each of different communication modes. Each signal may include information related to the same media device. Further, each signal may include information related to different media devices.

In operation 520, the media device 400 may receive types/instances of configuration information determined to be transmittable differently for each level, from the electronic device 101 that has received the signal. The electronic device 101 may determine whether it is possible to transmit each type/instance of configuration information differently for each of the identified level.

In operation 530, the media device 400 may set its configuration based on the configuration information. The media device 400 may identify the configuration information available for configuration of the media device 400, in the received configuration information. The media device 400 may set its configuration based on the determined available configuration information.

Figure 6:
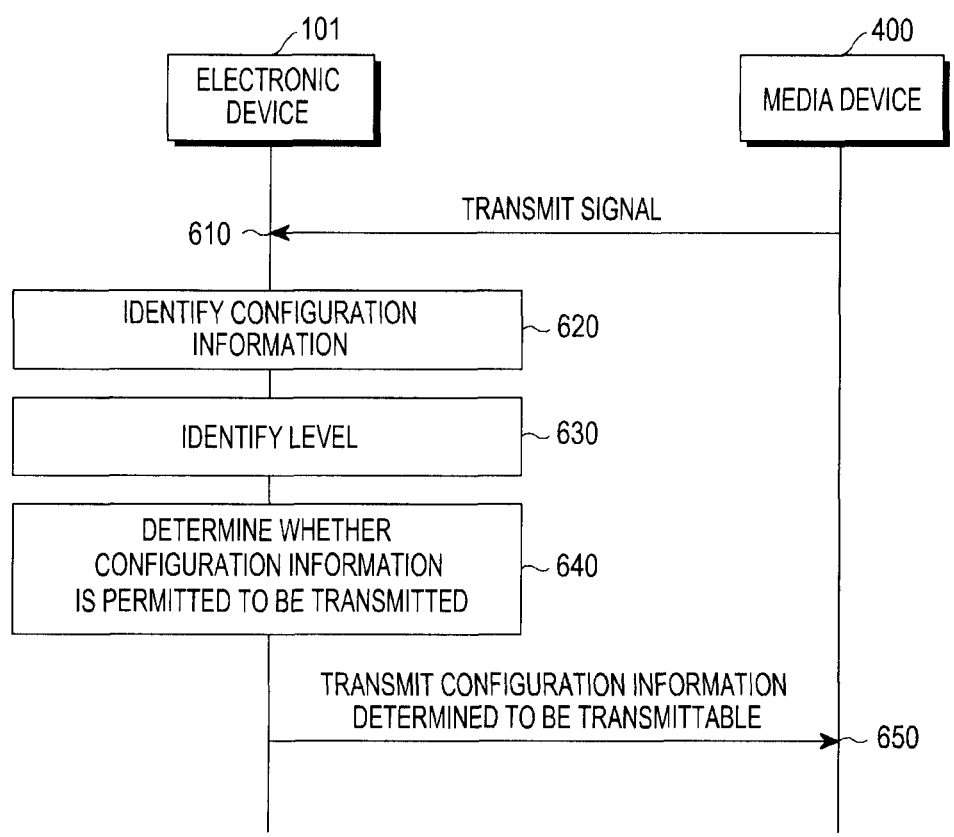
FIG. 6 is a flowchart of a configuration information transmission method by an electronic device according to various embodiments of the present disclosure.

FIG. 6 is a flowchart of a configuration information transmission method by an electronic device according to various embodiments of the present disclosure.

The flowchart shown in FIG. 6 illustrates a method for transmitting configuration information between the electronic device 101 and the media device 400.

In operation 610, the media device 400 may broadcast a signal(s) including information related to the media device 400 through each of different communication modes. The electronic device 101 may receive the signal through each of the different communication modes.

In operation 620, the electronic device 101 may identify configuration information to be used for setting the configuration of the media device 400 in response to the signal. The configuration information may be included in the memory 130 of the electronic device 101, and/or may be included in a separate external server. If the configuration information is included in the separate external server, the electronic device 101 may request the configuration information from the separate external server, and receive the configuration information from the separate external server in response to the request.

In operation 630, the electronic device 101 may identify a level of the configuration information, using any of the techniques described above. In operation 640, the electronic device 101 may determine whether the configuration information is permitted to be transmitted to the media device 400, based on the identified level of the configuration information. The electronic device 101 may determine whether the configuration information is permitted to be transmitted to the media device 400 differently for each level.

In operation 650, the electronic device 101 may transmit configuration information determined to be transmittable among the configuration information, to the media device. The media device 400 may receive the configuration information determined to be transmittable, and set its configuration based on the received configuration information.

Figure 7A:
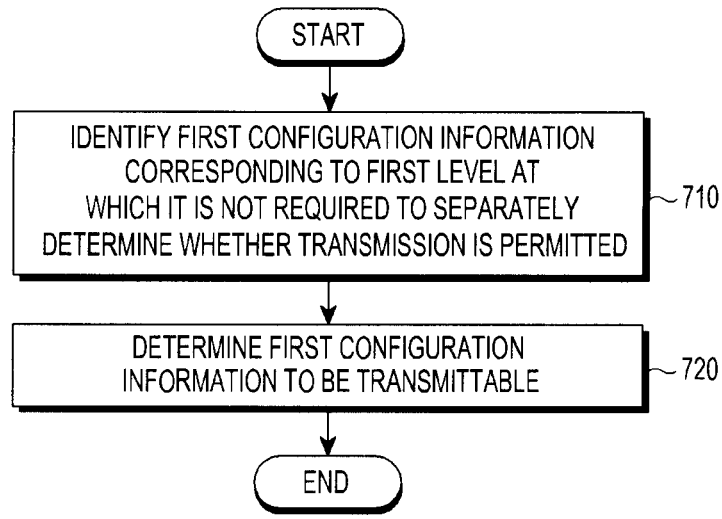
FIG. 7A, FIG. 7B and FIG. 7C are each a flowchart of a method for determining by an electronic device whether to transmit configuration information according to various embodiments of the present disclosure.
Figure 7B:
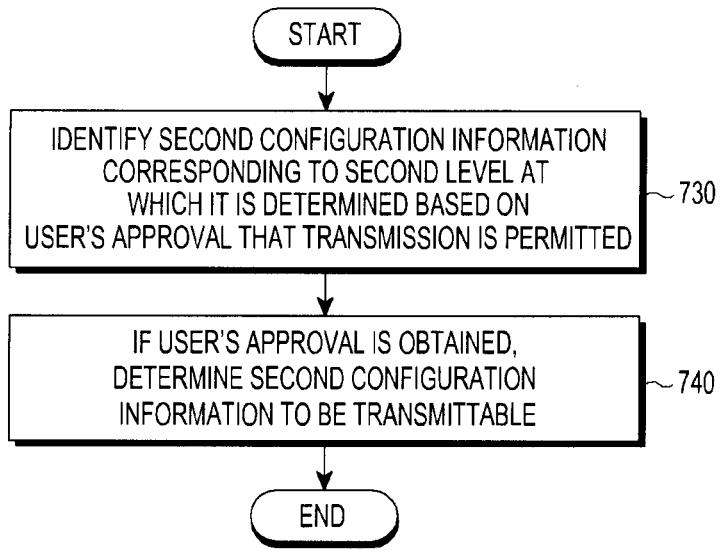
Figure 7C:
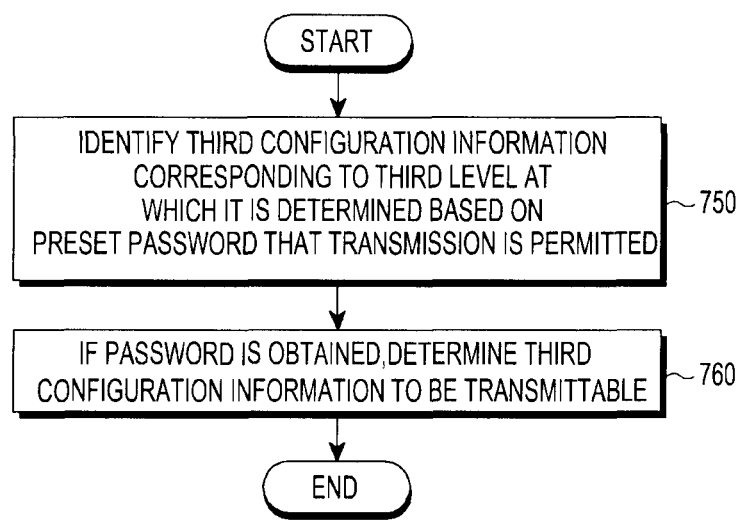

FIGS. 7A to 7C are flowcharts of a method for determining by an electronic device whether to transmit configuration information according to various embodiments of the present disclosure.

FIGS. 7A to 7C illustrate methods for determining first to third configuration information corresponding to first to third levels, respectively. It will be assumed herein that the first level corresponds to the lowest level and the third level corresponds to the highest level. However, this is for the purpose of explanation, and the criteria for determining a level and the number of determined levels are not limited to the first to third levels.

Referring to FIG. 7A, in operation 710, the electronic device 101 may identify, among available configuration information, first configuration information corresponding to a first level at which it is not required to separately determine whether the transmission is possible. For example, in the case of the first level corresponding to the lowest level depending on the various criteria for determining a level, it may not be required to separately determine whether the transmission is possible, for transmission of the first configuration information corresponding to the first level.

For example, in a case where the criteria for determining a level are the security level, a procedure that the user separately identifies may not be required in order to transmit low-security configuration information to the media device, or in a case where the criteria for determining a level are the priority level, a procedure that the user separately identifies may not be required in order to transmit low-priority configuration information to the media device.

In operation 720, the electronic device 101 may determine the first configuration information to be transmittable. As described above, since the first configuration information does not require a separate procedure in order to determine whether the transmission is possible, the first configuration information may be determined to be transmittable immediately after the first configuration information is determined to correspond to the first level.

Referring to FIG. 7B, in operation 730, the electronic device 101 may identify second configuration information corresponding to a second level at which it is determined based on a user's approval that the transmission is possible. For example, in the case of the second level corresponding to a level at which a user's approval is required for transmission depending on the various criteria for determining a level, a user's approval may be required for transmission of the second configuration information corresponding to the second level.

For example, in a case where the criteria for determining a level are the security level, a user's approval may be required to transmit, to the media device, high-security configuration information including information about the electronic device 101, or in a case where the criteria for determining a level are the priority level, a user's approval may be required to transmit, to the media device, configuration information for the configuration that should be performed preferentially.

In operation 740, if the user's approval is obtained, the electronic device 101 may determine the second configuration information to be transmittable. As such, for the configuration information that requires a user's approval in order to be transmitted to the media device 400, the electronic device 101 may not determine the configuration information to be transmittable unless the user's approval is obtained.

Referring to FIG. 7C, in operation 750, the electronic device 101 may identify third configuration information corresponding to a third level at which it is determined based on a preset password that the transmission is possible. For example, in the case of the third level corresponding to a level at which a preset password is required for transmission depending on the various criteria for determining a level, a preset password may be required for transmission of the third configuration information corresponding to the third level.

For example, in a case where the criteria for determining a level are the security level, a preset password may be required to transmit, to the media device, the top-security configuration information including information about the user of the electronic device 101, or in a case where the criteria for determining a level are the priority level, a preset password may be required to transmit, to the media device, the configuration information for the configuration that should be performed preferentially. In operation 760, if the password is obtained, the electronic device 101 may determine the third configuration information to be transmittable. As such, for the configuration information that requires a preset password in order to be transmitted to the media device 400, the electronic device 101 may not determine the configuration information to be transmittable unless the preset password is obtained.

Figure 8A:
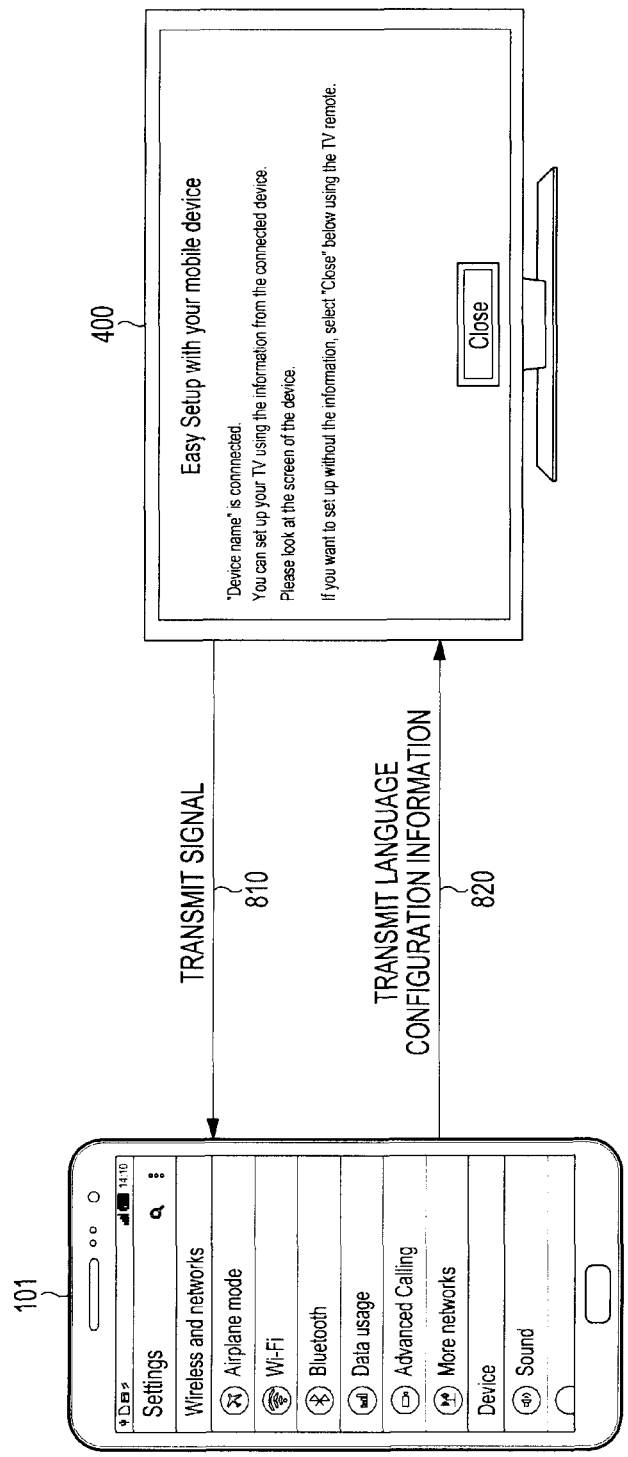
FIG. 8A, FIG. 8B and FIG. 8C each illustrate a method for determining by an electronic device whether to transmit configuration information according to various embodiments of the present disclosure.
Figure 8B:
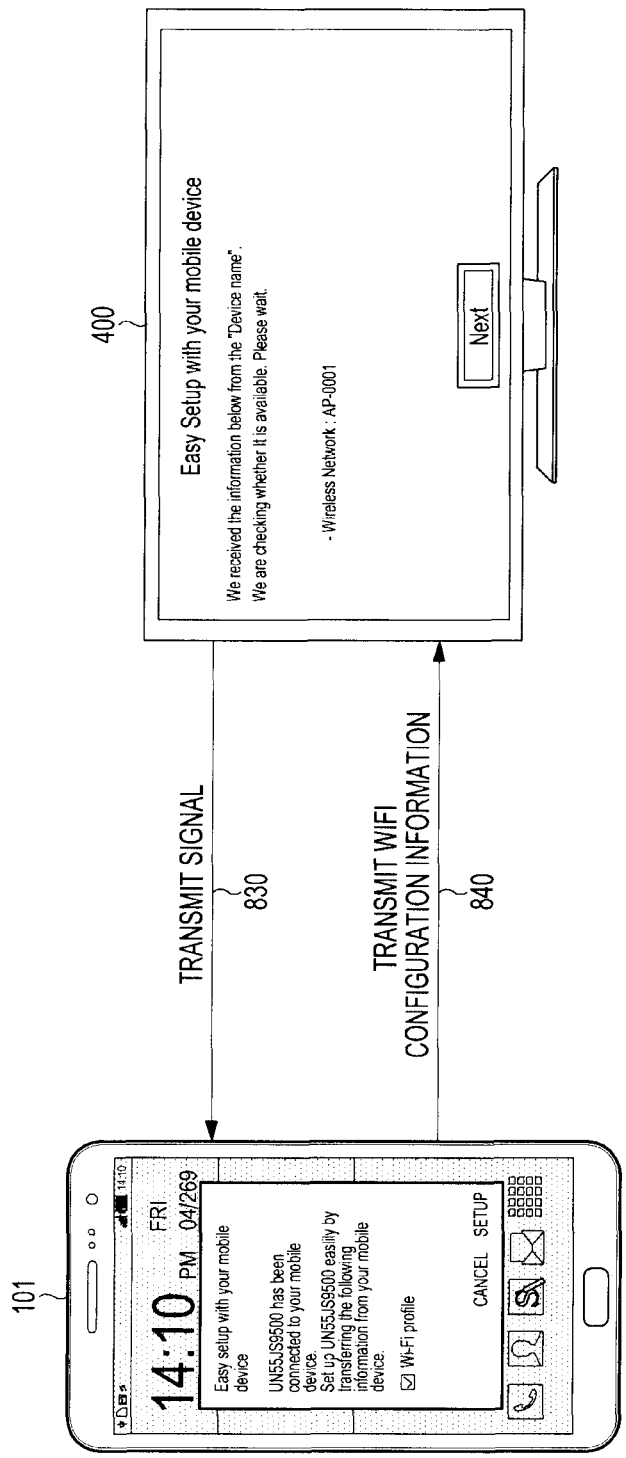
Figure 8C:
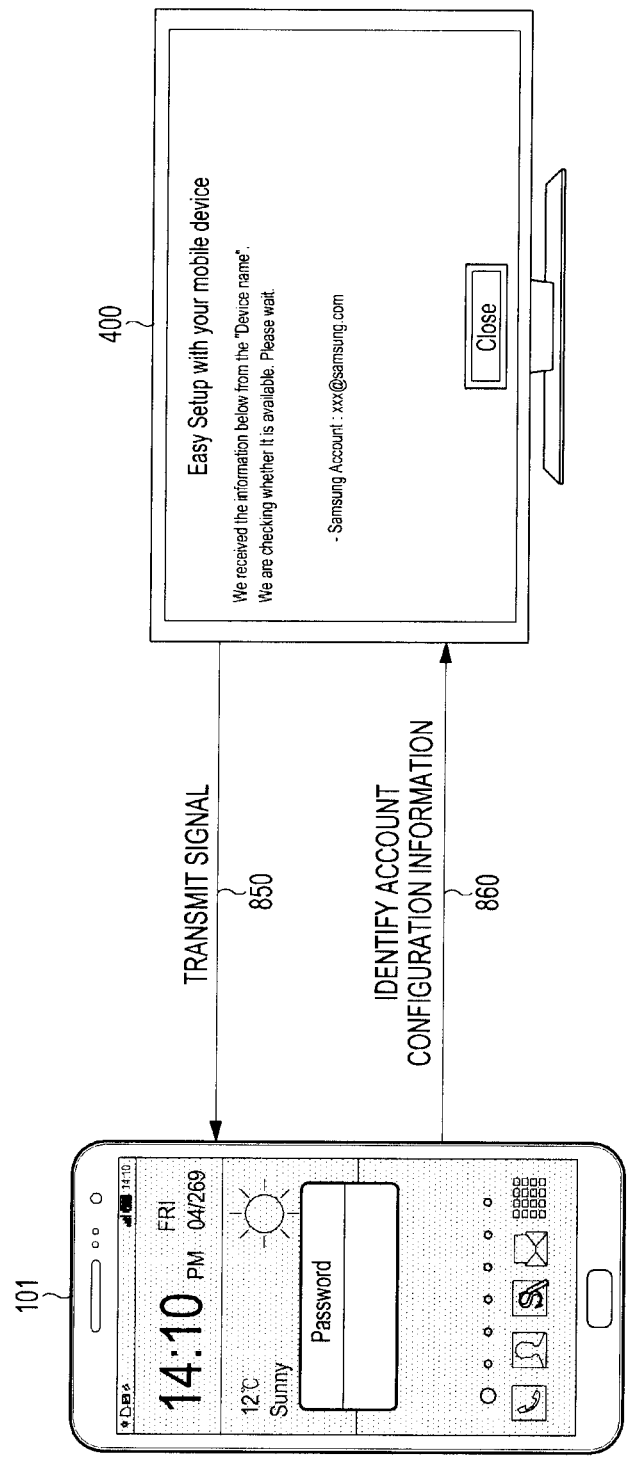

FIGS. 8A to 8C each illustrate a method for determining by an electronic device whether to transmit configuration information according to various embodiments of the present disclosure. In these examples, an electronic device 101 may determine whether it is permissible to transmit configuration information on the basis of a determined level of the configuration information, to a media device 400. The media device 400 may set its configuration based on the configuration information received thereby.

Referring to FIG. 8A, in operation 810, the electronic device 101 may receive a signal including information related to the media device 400 from the media device 400. The electronic device 101 may identify one or more types/instances of configuration information to be used for configuring the media device 400, based on the received signal. For example, it will be assumed that the electronic device 101 has identified language configuration information (or language setup information) as one of the types of configuration information to be used for configuring (setting up) the media device 400.

The electronic device 101 may identify a level for the language configuration information. If a criterion for determining a level is the security level, the language configuration information may be determined as a first level, i.e., a lowest security-risk level, since the language configuration information does not include sensitive information about the electronic device 101 or its user.

In operation 820, the electronic device 101 may transmit the language configuration information (or language setup information) to the media device 400 without separately determining whether the transmission is permissible. The media device 400 may set its language configuration using the language configuration information, received thereby. FIG. 8A shows a screen on which the language of the media device 400 is configured (or set up) as English, which is also the language set up in the electronic device 101.

Referring to FIG. 8B, in operation 830, the electronic device 101 may receive a signal including information related to the media device 400 from the media device 400. The electronic device 101 may identify configuration information to be used for configuration of the media device 400, based on the received signal. For example, it will be assumed that the electronic device 101 has identified WiFi configuration information (or WiFi setup information) as one type of configuration information to be used for setting the configuration of the media device 400.

As in the previous case of FIG. 8A, electronic device 101 may identify a level for the WiFi configuration information. If a criterion for determining a level is the security level, the WiFi configuration information may be determined as a second level, since the WiFi configuration information may include information about the electronic device 101 or information about the network environment.

In operation 840, the electronic device 101 may transmit the WiFi configuration information (or WiFi setup information) to the media device 400 after the user's approval is obtained. The media device 400 may set up a WiFi configuration upon receiving the WiFi configuration information. FIG. 8B shows a screen on which the electronic device 101 requests a user's input for transmission of the WiFi configuration information, and a screen on which the media device 400 configures or establishes a connection to the WiFi network based on the WiFi configuration information.

Referring to FIG. 8C, in operation 850, the electronic device 101 may receive a signal including information related to the media device 400 from the media device 400.

The electronic device 101 may identify configuration information to be used to set the configuration of the media device 400 based on the received signal. For example, it will be assumed that the electronic device 101 has identified account configuration information (or account setup information) as one type of configuration information to be used for configuring the media device 400.

The electronic device 101 may identify a level for the account configuration information. If a criterion for determining a level is the security level, the account configuration information may be determined as a third level, since the account configuration information may include sensitive information about the user of the electronic device 101.

In operation 860, the electronic device 101 may transmit the account configuration information (or account setup information) to the media device 400 after a preset password is obtained. The media device 400 may set up an account configuration in the media device 400 using the account configuration information received thereby. FIG. 8C shows a screen on which the electronic device 101 requests input of a preset password for transmission of the account configuration information, and a screen on which the media device 400 configures or sets up an account based on the account configuration information.

Figure 9A:
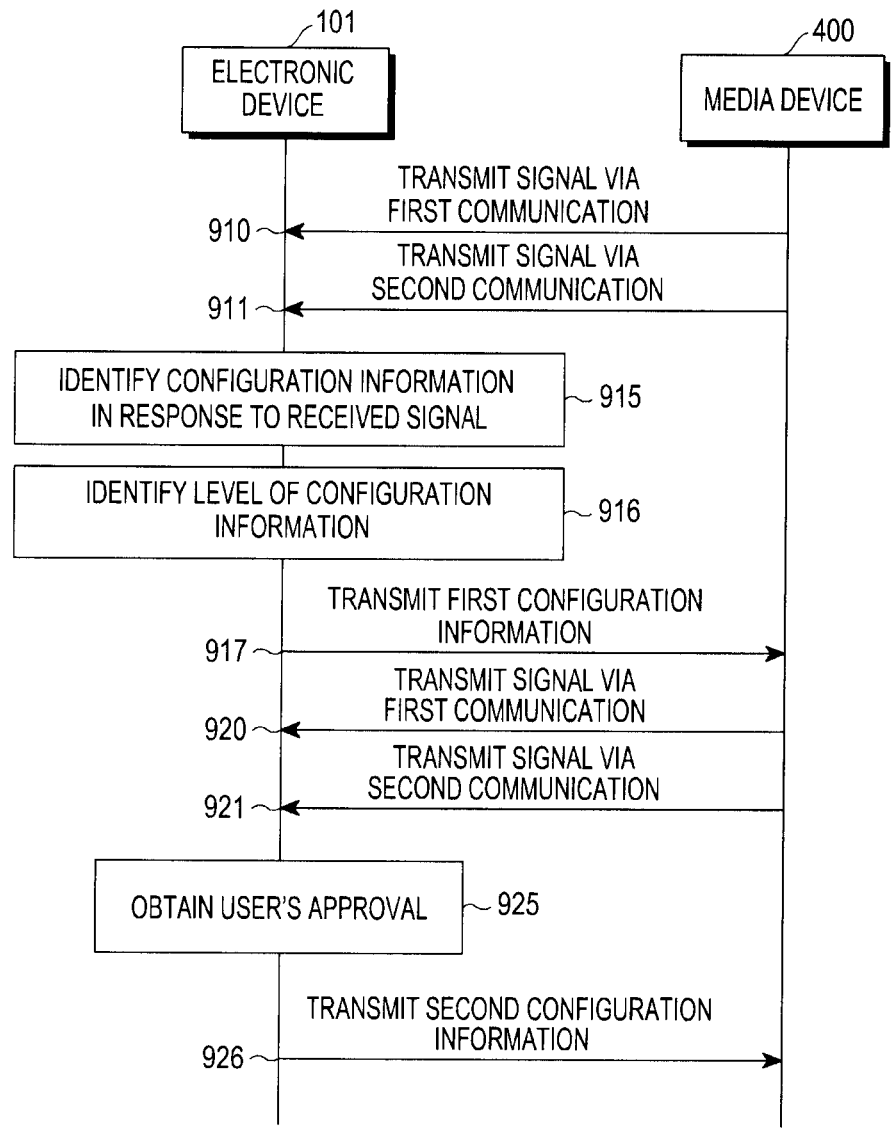
FIG. 9A and FIG. 9B are each a flowchart of a configuration information transmission method by an electronic device according to various embodiments of the present disclosure.
Figure 9B:
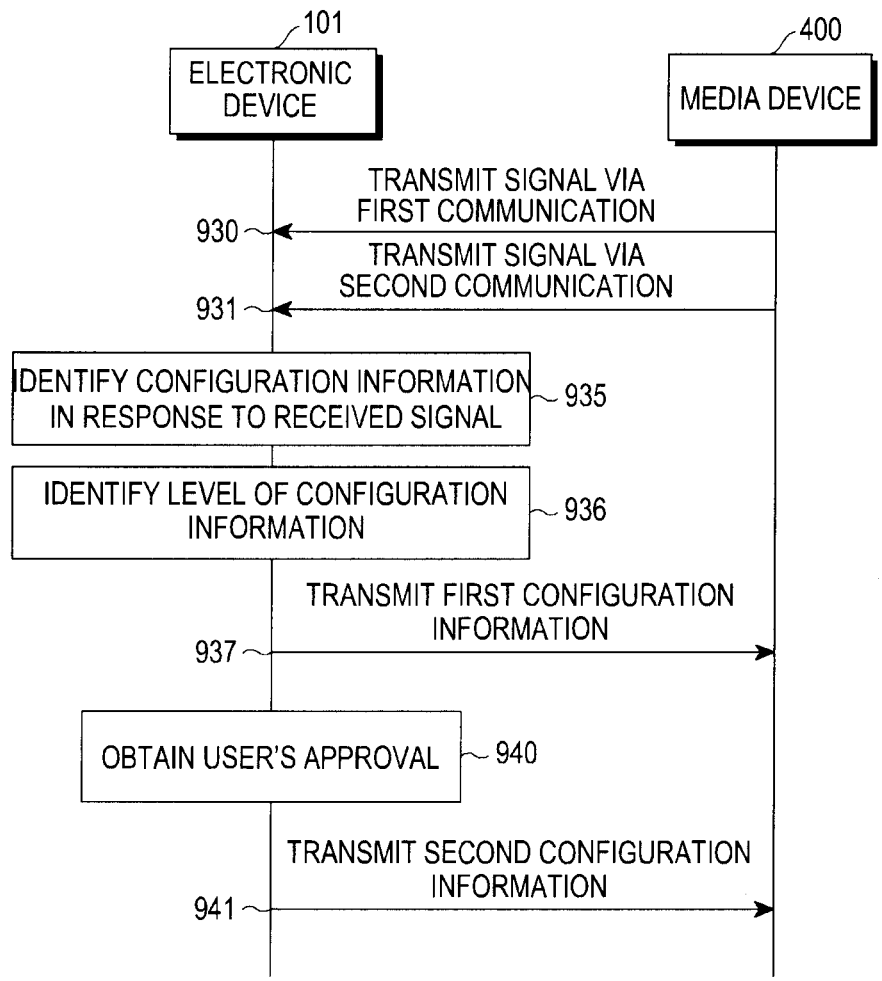

FIGS. 9A and 9B are flowcharts of a configuration information transmission method by an electronic device according to various embodiments of the present disclosure.

It will be assumed in FIGS. 9A and 9B that a signal including information related to the media device 400 is transmitted through first and second communications, i.e., using different communication schemes, modes or protocols.

In operation 910, the media device 400 may transmit a signal including information related to the media device 400 through first communication. In operation 911, the media device 400 may transmit, through second communication, a signal including information related to the media device 400, which is different from the signal transmitted through the first communication.

The media device 400 may transmit signals through the first and second communications in order to specify the electronic device 101 from which the media device 400 is to receive the configuration information.

In one embodiment, the first and second communications may be different from each other in terms of the following metrics, which may include at least one of the range (or coverage), the frequency band (e.g., 2.4 Ghz, 5 Ghz, 60 Ghz and the like), the permeability (e.g., object transmitting characteristics of radio waves), the bandwidth (e.g., the rate at which it is possible to deliver specific information faster than a required level), the packet size (e.g., a communication protocol capable of sending specific information at a time without splitting the information; for example, the packet size is 23 bytes for Bluetooth low energy (BLE), and 128 bits for sound communication), the modulation method, the channel scheduling management method, the encryption algorithm (e.g., Rivest-Shamir-Adleman (RSA), advanced encryption standard (AES) and the like), and the encryption level.

For example, a signal transmitted via the first communication may include state information of the media device, and a signal transmitted via the second communication may include information for identifying the media device. The electronic device 101 may receive the signal transmitted via the first communication and the signal transmitted via the second communication, and may determine whether the signal transmitted via the first communication and the signal transmitted via the second communication are signals transmitted from the same electronic device.

In operation 915, if the signal transmitted via the first communication and the signal transmitted via the second communication are signals transmitted from the same electronic device, the electronic device 101 may identify configuration information in response to the received signals. In contrast, if the signal transmitted via the first communication and the signal transmitted via the second communication are signals transmitted from different electronic devices, the electronic device 101 may not respond to the received signal. Further, in this case, the electronic device 101 may transmit a response signal indicating that it is not possible to deliver the configuration information to each of the different electronic devices.

In operation 916, the electronic device 101 may identify a level of the identified configuration information. In operation 917, the electronic device 101 may transmit, to the media device 400, first configuration information corresponding to a first level at which it is not required to separately determine whether the transmission is possible. If the signal transmitted via the first communication and the signal transmitted via the second communication do not include information required for transmission of configuration information corresponding to the second level or the third level, the electronic device 101 may transmit only the first configuration information to the media device 400.

In operation 920, the media device 400 may transmit a signal including information related to the media device 400 via the first communication. In operation 921, the media device 400 may transmit, via the second communication, a signal including information related to the media device 400, which is different from the signal transmitted via the first communication. In order to receive configuration information corresponding to the second level or the third level, the media device 400 may include information required for transmission of configuration information corresponding to the second level or the third level, in at least one of the signal transmitted via the first communication and the signal transmitted via the second communication, and transmit the signal to the electronic device 101.

In operation 925, the electronic device 101 may determine that the information required for transmission of configuration information corresponding to the second level or the third level is included in the signal transmitted via the first communication and the signal transmitted via the second communication. In this case, the electronic device 101 may obtain a user's approval or a preset password in order to transmit the configuration information corresponding to the second level or the third level.

In operation 926, the electronic device 101 may transmit the second configuration information if the user's approval is obtained. Further, although not shown, the electronic device 101 may transmit the third configuration information upon receiving the preset password.

FIG. 9B shows a flowchart of a case where the information required for transmission of the configuration information corresponding to the second level or the third level is included in at least one of the signal transmitted via the first communication and the signal transmitted via the second communication that the media device 400 transmits in operations 930 and 931.

In operation 935, if the signal transmitted via the first communication and the signal transmitted via the second communication are signals transmitted from the media device 400 which is the same electronic device, the electronic device 101 may identify configuration information in response to the received signals.

In operation 936, the electronic device 101 may identify a level of the identified configuration information. In operation 937, the electronic device 101 may transmit, to the media device 400, first configuration information corresponding to the first level at which it is not required to separately determine whether the transmission is possible.

In operation 940, the electronic device 101 may obtain a user's approval, for transmission of second configuration information. In operation 941, the electronic device 101 may transmit the second configuration information. Further, although not shown, the electronic device 101 may obtain a preset password, for transmission of third configuration information. Further, the electronic device 101 may transmit the third configuration information upon receiving the preset password.

Figure 10:
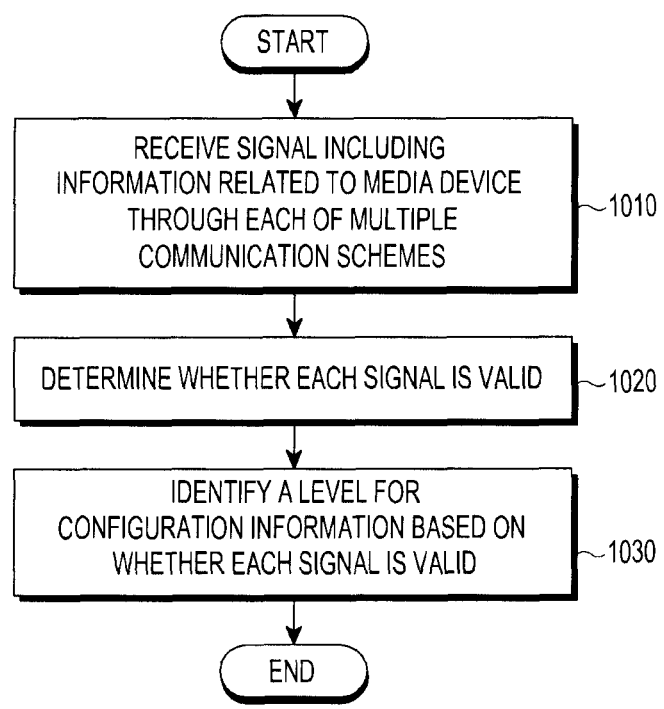
FIG. 10 is a flowchart of a method for determining by an electronic device whether to transmit configuration information based on whether a received signal is valid, according to various embodiments of the present disclosure.

FIG. 10 is a flowchart of a method for determining by an electronic device whether to transmit configuration information based on whether a received signal is valid, according to various embodiments of the present disclosure.

In operation 1010, the electronic device 101 may receive signal including information related to the media device 400 via each of different communication modes. As described above, the media device 400 may transmit signals via different respective communication modes.

In operation 1020, the electronic device 101 may determine whether each received signal is valid. For example, the electronic device 101 may determine whether each signal is valid, based on whether information included in the signal is lost, or on the data format.

In operation 1030, the electronic device 101 may identify a level for each type/instance of configuration information based on whether at least one (or each) identified signal is valid.

For example, if a first signal received via the first communication mode is valid, the electronic device 101 may identify first configuration information corresponding to the first level, among the configuration information to be used for configuration of the media device, in response to the signal. Further, if the first and second signals received via the first and second communication modes are valid, the processor 120 may identify second configuration information corresponding to the second level, among the configuration information, in response to the first and signals.

Further, if the first signal transmitted via the first communication mode is valid, the electronic device 101 may determine, as a first level, configuration information determined based on information related to the media device, which is included in the first signal. Further, if the first and second signals received via the first and second communication modes are valid, the electronic device 101 may determine, as a second level, configuration information determined in common based on the information related to the media device, which is included in each of the first and second signals.

Figure 11A:
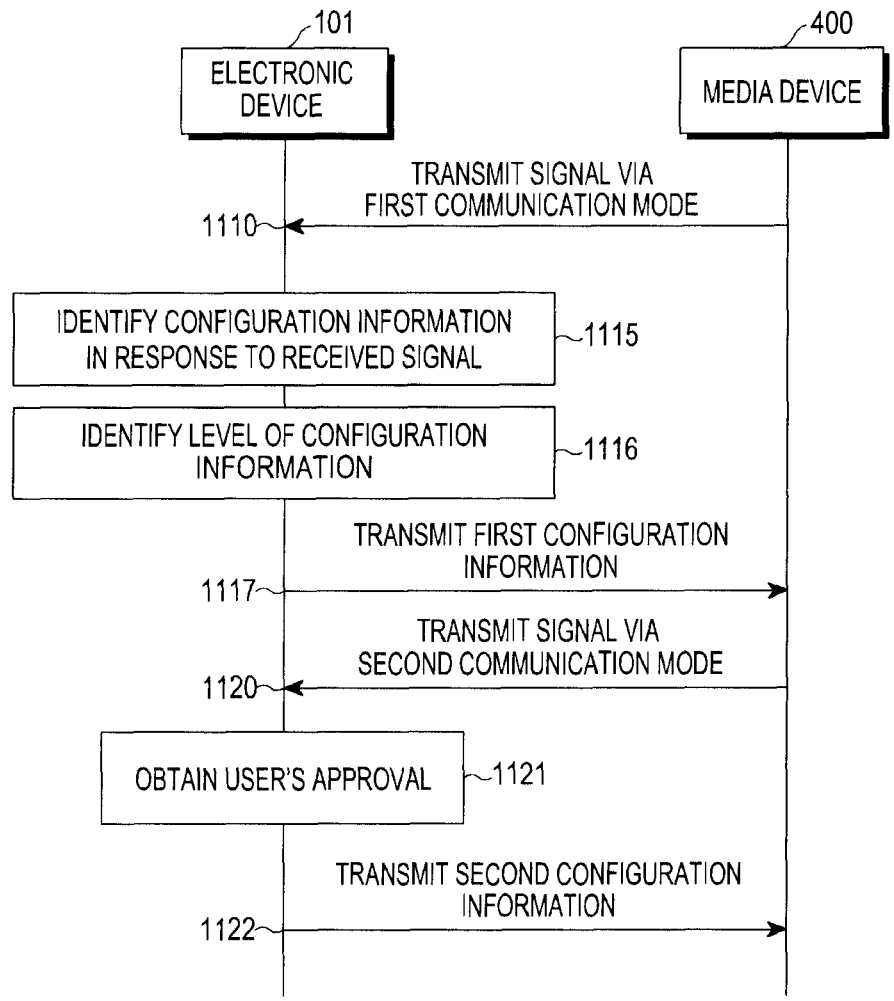
FIG. 11A and FIG. 11B are each a flowchart of a configuration information transmission method by an electronic device according to various embodiments of the present disclosure.
Figure 11B:
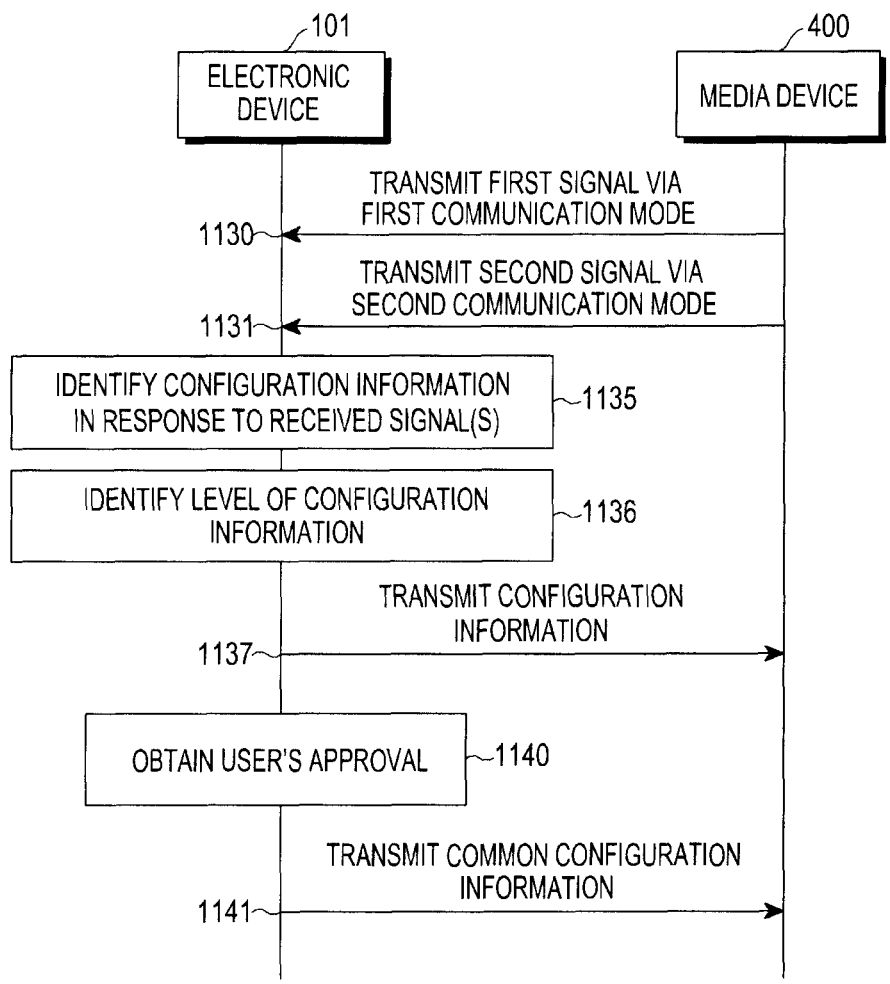

FIGS. 11A and 11B are flowcharts of a configuration information transmission method by an electronic device according to various embodiments of the present disclosure.

In the method described in FIGS. 11A and 11B, the electronic device 101 may identify a level of configuration information based on whether a signal(s) received from the media device 400 is valid.

In operation 1110, the media device 400 may transmit a signal including information related to the media device 400, via a first communication mode. The electronic device 101 may determine whether the signal received via the first communication is valid.

In operation 1115, if the signal received via the first communication is valid, the electronic device 101 may identify configuration information in response to the received signal. In operation 1116, the electronic device 101 may identify a level of the identified configuration information. For example, the electronic device 101 may identify first configuration information corresponding to the first level, among the configuration information. In operation 1117, the electronic device 101 may transmit the first configuration information. For example, as for second configuration information corresponding to the second level, among the configuration information determined based on the signal transmitted via the first communication, the electronic device 101 may not transmit the second configuration information to the media device even if the signal transmitted via the first communication is valid. In order for the second configuration information to be transmitted, the second configuration information may be set in advance to be transmitted, if the signal transmitted via the second communication mode different from the first communication mode, as well as the signal transmitted via the first communication, is valid.

Further, the electronic device 101 may not identify second configuration information corresponding to the second level, among the identified configuration information. The electronic device 101 may be set to identify the second configuration information only if the signal transmitted via the second communication as well as the signal transmitted via the first communication is valid.

In operation 1120, the media device 400 may transmit a signal including information related to the media device 400 via the second communication.

In one embodiment, although not shown, if the signal received via the second communication is valid and the electronic device 101 has identified only the first configuration information in operation 1116, the electronic device 101 may identify second configuration information corresponding to the second level, among the identified configuration information.

In operation 1121, if the signal received via the second communication is valid, the electronic device 101 may obtain the user's approval, for transmission of the second configuration information.

In operation 1122, the electronic device 101 may transmit the second configuration information to the media device 400.

Referring to FIG. 11B, in operations 1130 and 1131, the media device 400 may transmit a first signal including information related to the media device 400 via first communication, and a second signal including information related to the media device 400 via second communication.

In operation 1135, the electronic device 101 may identify configuration information response to the received signals. For example, the electronic device 101 may identify configuration information that is based on the first signal transmitted via the first communication, and identify configuration information that is based on the second signal transmitted via the second communication.

In operation 1136, the electronic device 101 may identify a level for each of the configuration information that is based on the first signal and the configuration information that is based on the second signal. For example, the electronic device 101 may designate a second level to the configuration information that is common in the configuration information based on the first signal and the configuration information based on the second signal, and may designate a first level to the configuration information that is not common.

In operation 1137, the electronic device 101 may transmit first configuration information corresponding to the first level.

In operation 1140, the electronic device 101 may obtain a user's approval in order to transmit the second configuration information corresponding to the second level. In operation 1141, the electronic device 101 may transmit the second configuration information corresponding to the second level. The second configuration information may be the configuration information that is common in the configuration information based on the first signal and the configuration information based on the second signal.

Although transmission of third configuration information corresponding to a third level is not shown in FIGS. 11A and 11B, the electronic device 101 may transmit the third configuration information to the media device 400 by determining whether it is permitted to transmit the third configuration information in the same manner by a signal transmitted via third communication different from the first and second communications.

Figure 12:
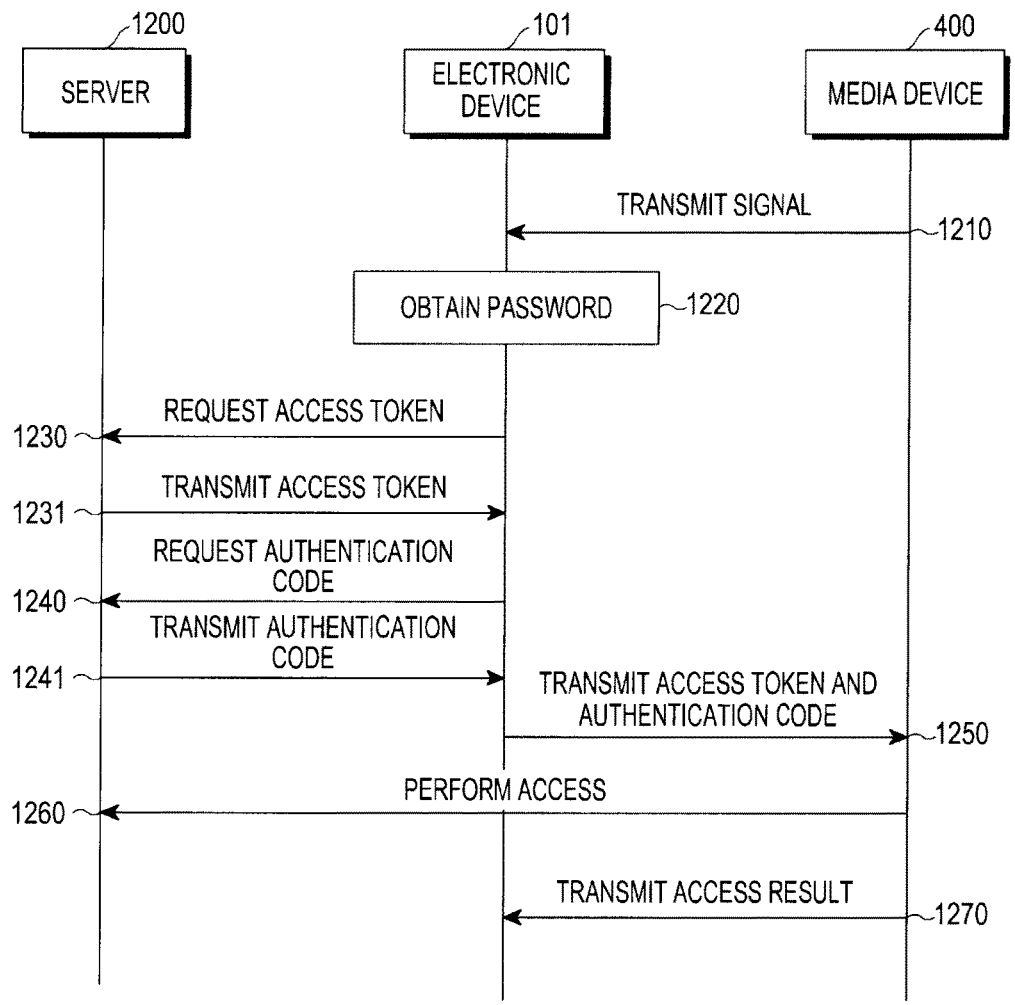
FIG. 12 is a flowchart of a server access method by a media device according to various embodiments of the present disclosure.

FIG. 12 is a flowchart of a server access method by a media device according to various embodiments of the present disclosure.

In operation 1210, the media device 400 may transmit a signal including information related to the media device 400. The electronic device 101 may receive the signal from the media device 400.

In operation 1220, the electronic device 101 may determine whether it is permitted to transmit configuration information for an access to a server 1200, to the media device 400. If the criteria for determining a level are the security level, the configuration information for an access to the server 1200 may be determined as a third level, since the configuration information may include user information of the electronic device 101. Therefore, the electronic device 101 may request the user to input a preset password in order to determine whether it is permitted to transmit configuration information for an access to the server 1200, and obtain the preset password in response to the user's input.

In operation 1230, the electronic device 101 may request an access token from the server 1200. The access token may be a kind of object that includes security information required during an access to the server 1200. The access token may be created during every access to the server 1200, and may be used to identify the user. The access token may be valid only for a preset time on the basis of the time the access token was requested.

In operation 1231, if the electronic device 101 is identified, the server 1200 may transmit the access token to the electronic device.

In operation 1240, the electronic device 101 may request an authentication code from the server 1200. The authentication code may include the information that is required when another electronic device other than the electronic device 101 makes an access to the server 1200. In operation 1241, the server 1200 may transmit the authentication code to the electronic device 101.

In operation 1250, the electronic device 101 may transmit the access token and the authentication code included in the configuration information for an access to the server 1200, to the media device 400.

In operation 1260, the media device 400 may make an access to the server 1200 using the received access token and authentication code. In operation 1270, the media device 400 may transmit the access result to the server 1200, to the electronic device 101.

As such, the media device 400 may receive configuration information for an access to the server 1200 from the electronic device 101. The electronic device 101 may request, from the server 1200, configuration information that is not included in the electronic device 101, in the configuration information for an access to the server 1200. The electronic device 101 may receive the configuration information for an access from the server 1200, and transfer the received configuration information to the media device 400.

Figure 13:
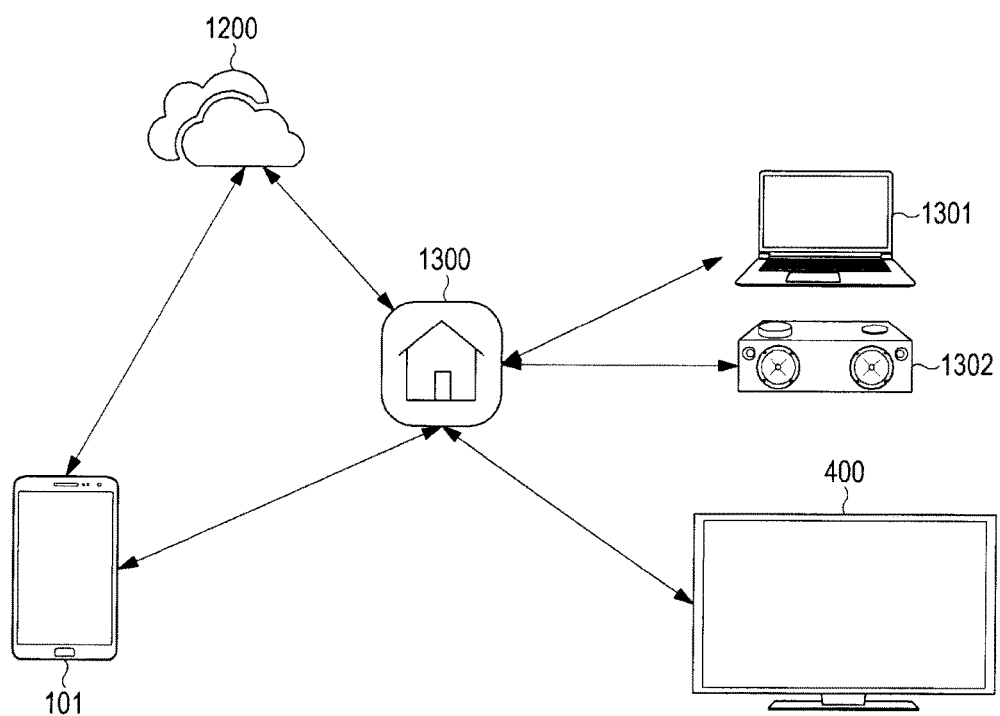
FIG. 13 illustrates a method for transmitting configuration information via a personal server by an electronic device according to various embodiments of the present disclosure.

FIG. 13 illustrates a method for transmitting configuration information via a personal server by an electronic device according to various embodiments of the present disclosure. In this example, an electronic device 101 and media device 400 are connected to a personal server 1300, and the electronic device 101 may transfer the configuration information to the media device 400 via the personal server 1300. For example, the personal server 1300 may be a home server that controls or manages various electronic devices such as a smart TV, a smartphone and an audio device, which are included in the home network.

Further, the personal server 1300 may additionally transmit configuration information provided by other electronic devices 1301 and 1302 connected to the personal server 1300, to the media device 400. In this manner, a first part of overall configuration information used to set a complete configuration of media device 400 may be provided by device 101 and another part of the overall configuration information may be provided by devices 1301 and/or 1302.

Personal server 1300 may receive a signal including information related to the media device 400, which is broadcast from media device 400, and transmit the received signal to the electronic device 101. Further, upon receiving the signal, the personal server 1300 may spontaneously identify configuration information to be used for setting the configuration of the media device 400 based on the received signal, and identify a level of the configuration information. Accordingly, if a user's approval or a preset password is required based on the identified level, the personal server 1300 may request the user's approval or the preset password from the electronic device 101.

Figure 14:
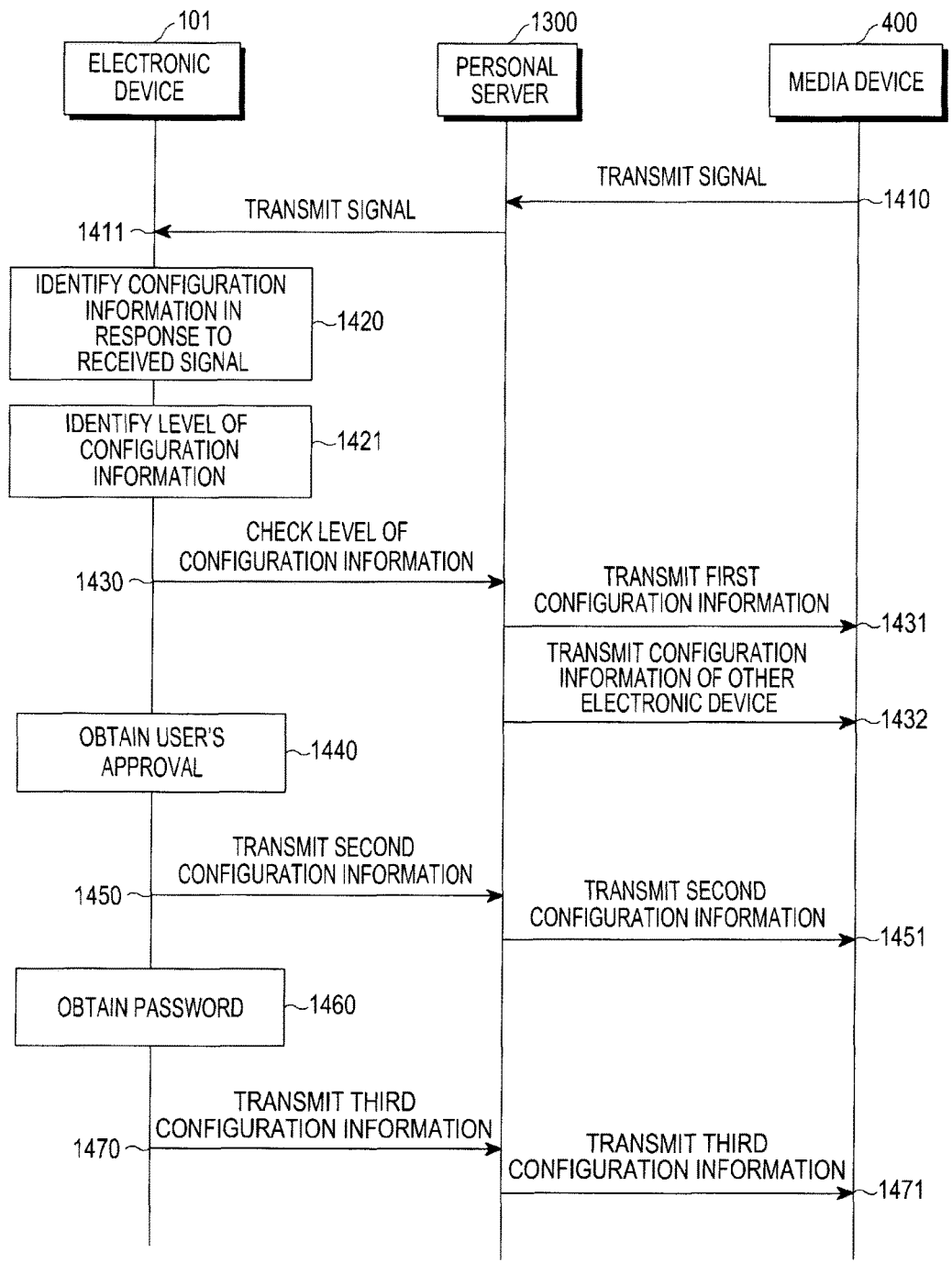
FIG. 14 is a flowchart of a method for transmitting configuration information via a personal server by an electronic device according to various embodiments of the present disclosure.

FIG. 14 is a flowchart of a method for transmitting configuration information via a personal server by an electronic device according to various embodiments of the present disclosure.

In operation 1410, the media device 400 may transmit a signal including information related to the media device 400. If the media device 400 and the electronic device 101 are connected to the same personal server 1300, the media device 400 may directly transmit the signal to the electronic device 101, or may transmit the signal via the personal server 1300 as in operation 1410.

In operation 1411, the personal server 1300 may transmit the signal received from the media device 400 to the electronic device 101. The personal server 1300 may serve as a relay between the electronic device 101 and the media device 400 as shown in FIG. 14, and the personal server 1300 may identify the configuration information directly based on the signal. A method in which the personal server (or home server) 1300 directly identifies configuration information and transmits the configuration information by identifying a level for the configuration information will be described in FIG. 15.

In operation 1420, the electronic device 101 may identify configuration information to be used for configuration of the media device 400 in response to the received signal. In operation 1421, the electronic device 101 may identify a level of the configuration information.

In operation 1430, the electronic device 101 may transmit first configuration information corresponding to the first level among the configuration information, to the personal server 1300. In operation 1431, the personal server 1300 may transmit the received first configuration information to the media device 400. Further, in operation 1432, the personal server 1300 may transmit configuration information of another electronic device connected to the personal server 1300, to the media device 400. By transmitting the configuration information of another electronic device to the media device 400, the personal server 1300 may make it possible for the configuration information of another electronic device to be used in the media device 400.

In operation 1440, the electronic device 101 may obtain a user's approval in order to transmit the configuration information corresponding to the second level. In operation 1450, the electronic device 101 may transmit second configuration information corresponding to the second level, to the personal server 1300. In operation 1451, the personal server 1300 may transmit the received second configuration information to the media device 400.

In operation 1460, the electronic device 101 may obtain a preset password in order to transmit configuration information corresponding to the third level. In operation 1470, the electronic device 101 may transmit the third configuration information corresponding to the third level to the personal server 1300. In operation 1471, the personal server 1300 may transmit the received third configuration information to the media device 400.

Figure 15:
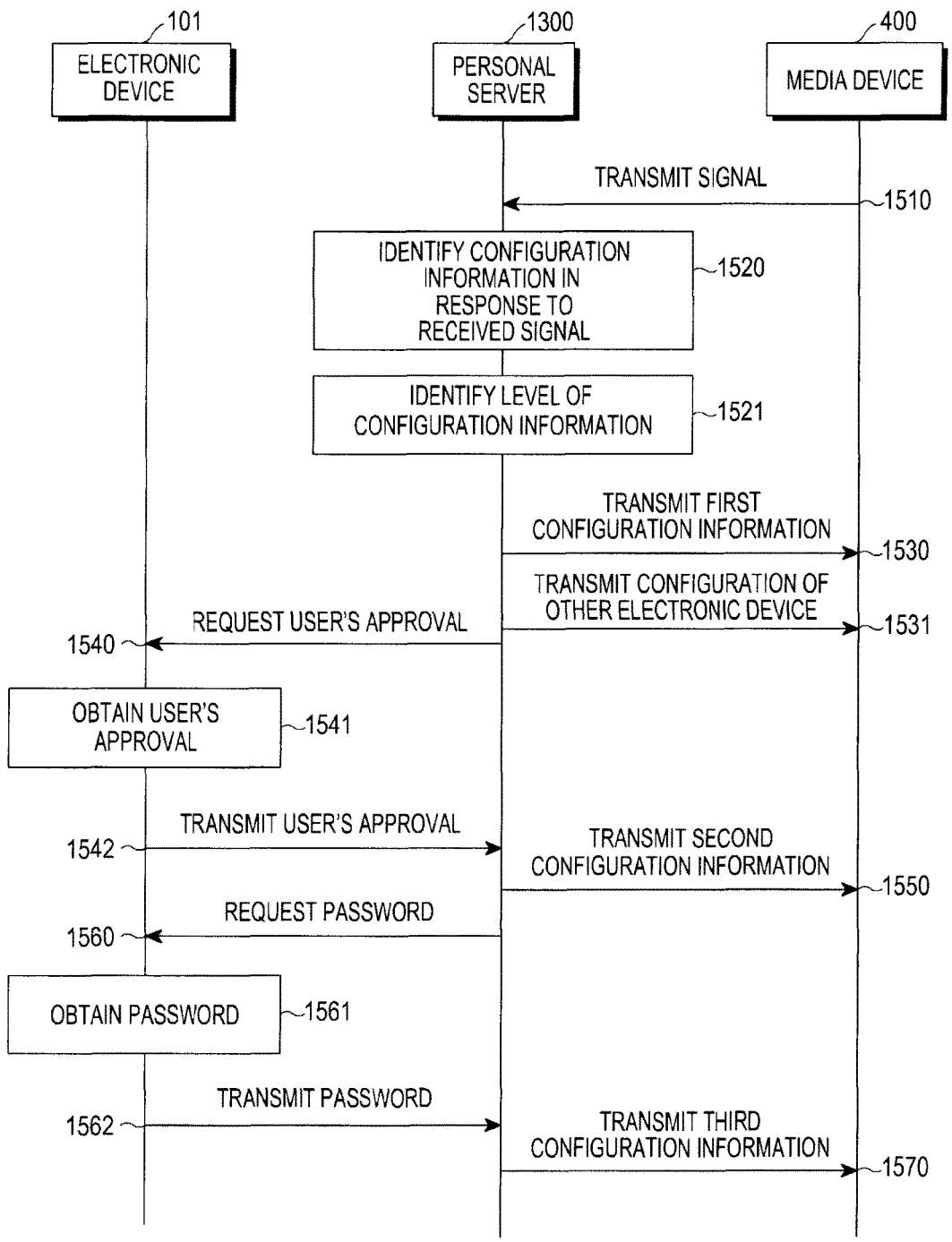
FIG. 15 is a flowchart of a method for transmitting configuration information by a personal server according to various embodiments of the present disclosure.

FIG. 15 is a flowchart of a method for transmitting configuration information by a personal server according to various embodiments of the present disclosure.

A method in which the personal server 1300 directly identifies and transmits configuration information to be used for configuration of the media device 400 will be described in FIG. 15.

In operation 1510, the media device 400 may transmit a signal including information related to the media device 400. The personal server 1300 may receive the signal broadcasted by the media device 400.

In operation 1520, the personal server 1300 may identify the at least one configuration information in response to the received signal. In operation 1521, the personal server 1300 may identify a level of at least one of the at least one configuration information. Since the operation that the personal server 1300 performs in operations 1520 and 1521 is the same as the above-described operation in which the electronic device 101 identifies configuration information in response to the received signal and identifies a level of at least one of the at least one configuration information, a detailed description thereof will be omitted.

In operation 1530, the personal server 1300 may transmit first configuration information corresponding to the first level among the at least one configuration information, to the media device 400. Further, in operation 1531, the personal server 1300 may transmit configuration information of another electronic device connected to the personal server 1300, to the media device 400. By transmitting the configuration information of another electronic device to the media device 400, the personal server 1300 may make it possible for the configuration information of another electronic device to be used in the media device 400.

In operation 1540, the personal server 1300 may request a user's approval from the electronic device 101 in order to transmit configuration information corresponding to the second level. The personal server 1300 may obtain the user's approval, and if it is not possible to obtain the user's approval, the personal server 1300 may request a user's approval from the electronic device 101 or another electronic device. It will be assumed herein that the personal server 1300 requests the user's approval from the electronic device 101.

In operation 1541, the electronic device 101 may obtain a user's approval in response to the request. In operation 1542, the electronic device 101 may transmit the user's approval to the personal server 1300. In operation 1550, the personal server 1300 may transmit the second configuration information to the media device 400 upon obtaining the user's approval from the electronic device 101.

In operation 1560, the personal server 1300 may request a preset password from the electronic device 101 in order to transmit configuration information corresponding to the third level. The personal server 1300 may directly obtain the password, and if it is not possible to directly obtain the password, the personal server 1300 may request the password from the electronic device 101 or another electronic device. It will be assumed herein that the personal server 1300 requests the password from the electronic device 101.

In operation 1561, the electronic device 101 may obtain a preset password in response to the request. In operation 1562, the electronic device 101 may transmit the password to the personal server 1300. In operation 1570, the personal server 1300 may transmit the third configuration information to the media device 400 upon obtaining the password from the electronic device 101.

As such, the personal server 1300 may directly identify configuration information in response to the signal broadcasted from the media device 400, and transmit the configuration information to the media device 400 by identifying a level of at least one of the at least one configuration information.

Figure 16:
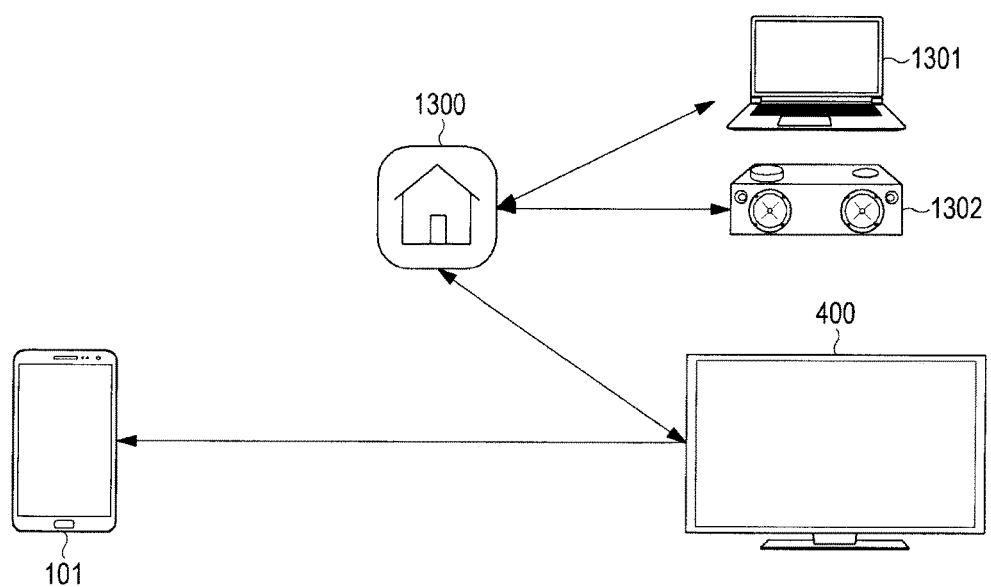
FIG. 16 illustrates a method for receiving configuration information from a personal server by a media device according to various embodiments of the present disclosure.

FIG. 16 illustrates a method for receiving configuration information from a personal server by a media device according to various embodiments of the present disclosure.

In various embodiments of the present disclosure, in a case where the electronic device 101 and the media device 400 are connected to the personal server 1300, the media device 400 may additionally receive configuration information of other electronic devices 1301 and 1302 via the personal server 1300.

For example, upon receiving at least one configuration information to be used for configuration of the media device 400 from the electronic device 101, the media device 400 may make a connection to the personal server 1300 based on the received at least one configuration information. Further, the media device 400 may request configuration information of the other electronic devices 1301 and 1302 from the personal server 1300, and receive the configuration information of the other electronic devices 1301 and 1302, which is transmitted from the personal server 1300.

Figure 17:
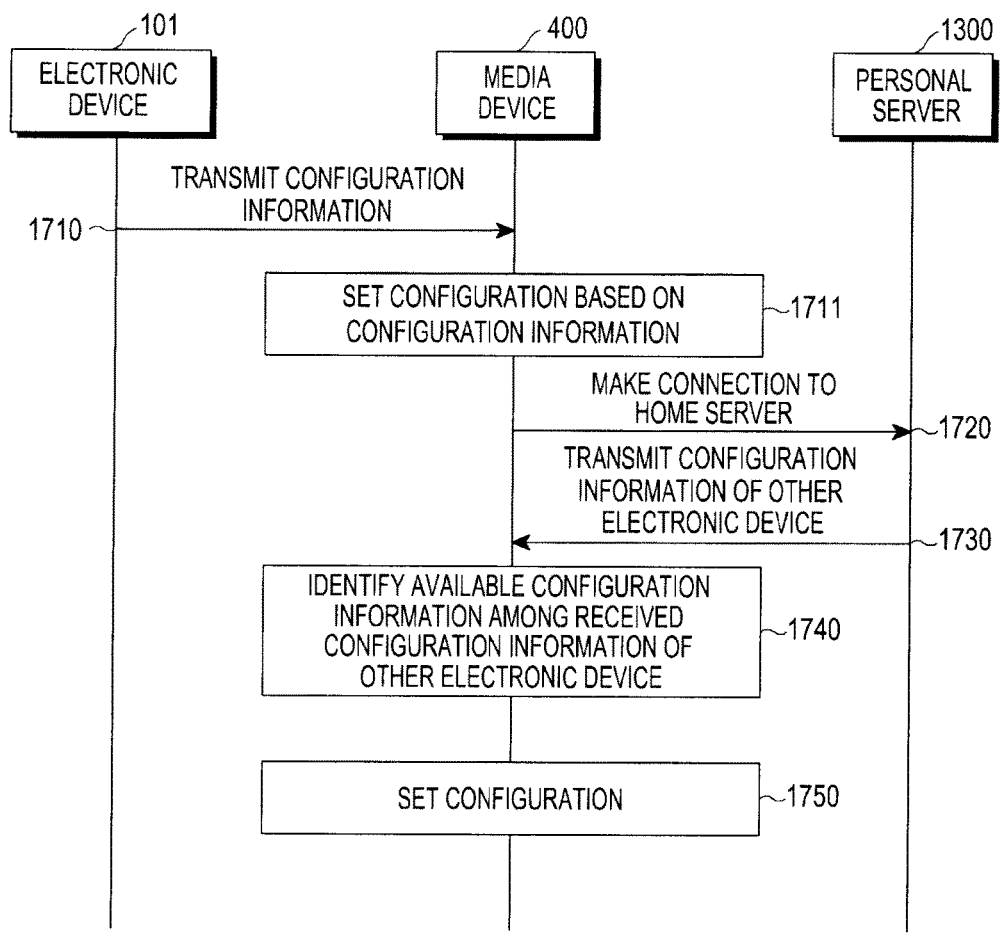
FIG. 17 is a flowchart of a method for receiving configuration information from a personal server by a media device according to various embodiments of the present disclosure.

FIG. 17 is a flowchart of a method for receiving configuration information from a personal server by a media device according to various embodiments of the present disclosure.

A flowchart after the media device 400 has received the at least one configuration information from the electronic device 101 will be described in FIG. 17.

In operation 1710, the electronic device 101 may transmit the at least one configuration information to the media device 400 based on a signal broadcast from the media device 400.

In operation 1711, the media device 400 may perform configuration based on the received at least one configuration information. The media device 400 may identify available configuration information in the received at least one configuration information, and set its configuration based on the identified available configuration information.

In operation 1720, the media device 400 may make a connection to the personal server 1300 based on the received at least one configuration information. In a case where the electronic device 101 is connected to the home network via the personal server 1300, the electronic device 101 may include connection information to the personal server 1300 in the at least one configuration information. The media device 400 may make a connection to the personal server 1300 based on the connection information to the personal server 1300.

In operation 1730, the personal server 1300 may transmit configuration information provided from other electronic devices connected to the personal server 1300 to the media device 400.

In operation 1740, the media device 400 may identify available configuration information in the received configuration information of other electronic devices. In operation 1750, the media device 400 may set its configuration based on the identified available configuration information.

Figure 18:
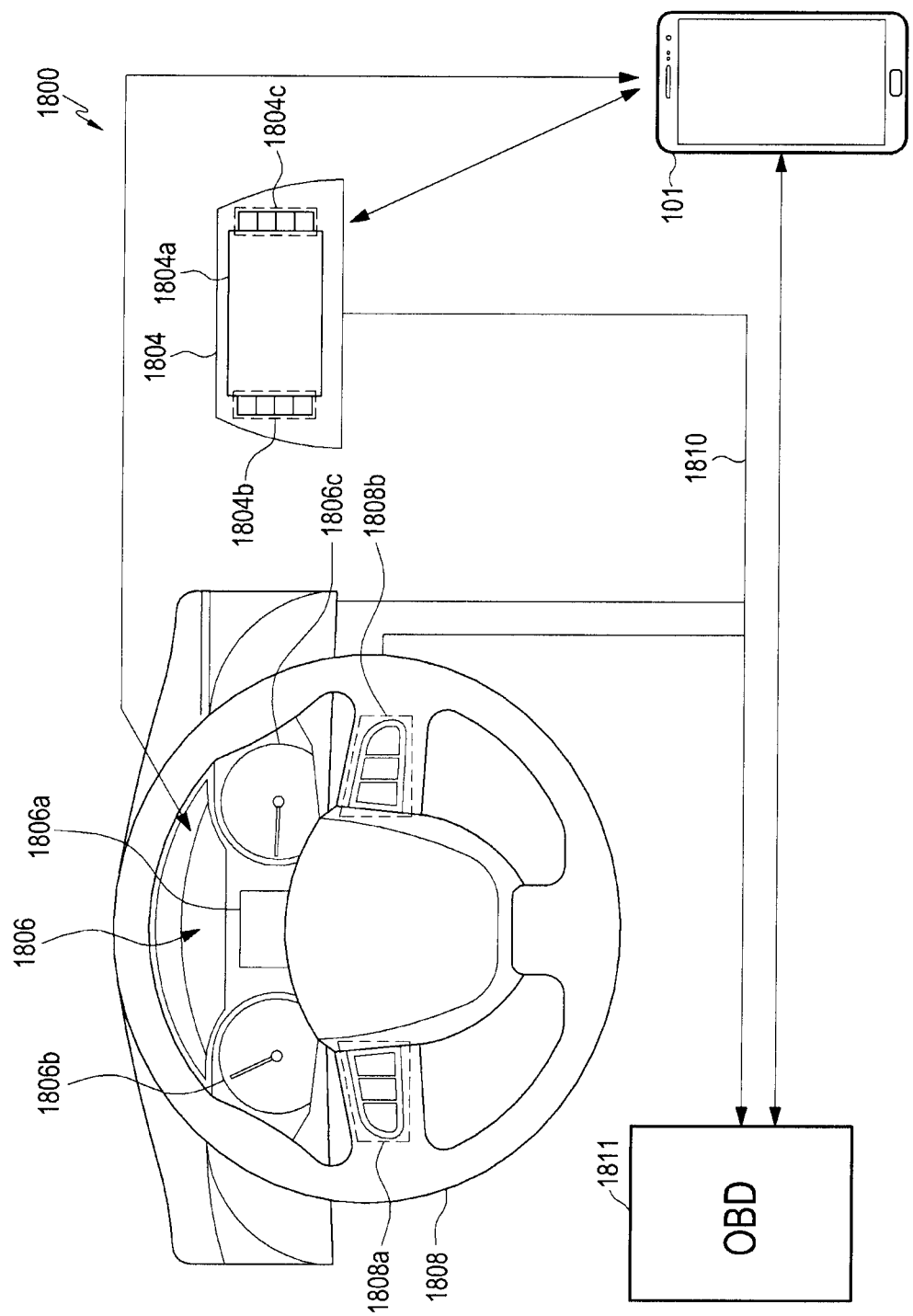
FIG. 18 illustrates a method for transmitting configuration information to a media device included in a vehicle by an electronic device according to various embodiments of the present disclosure.

FIG. 18 illustrates a method for transmitting configuration information to a media device included in a vehicle by an electronic device according to various embodiments of the present disclosure.

As shown in FIG. 18, in recent years, a variety of media devices may be included in a vehicle 1800, so the vehicle 1800 may be regarded as a media device. Further, the electronic device 101 may deliver configuration information to at least one of the vehicle 1800 and a media device included in the vehicle 1800.

For example, the vehicle 1800 may include a head unit 1804 which is a vehicle electronic device, an instrument panel 1806, and a steering wheel 1808 for controlling the vehicle 1800.

For example, the head unit 1804 may include navigation equipment, an audio/video player and the like. The head unit 1804 may include a display 1804a for displaying map, navigation instructions, information about radio and music, video content and the like. The display 1804a may be a touch screen. Further, the head unit 1804 may include buttons 1804b and 1804c for controlling the head unit 1804.

Further, the instrument panel 1806 may include a display 1806a for displaying driving information of the vehicle 1800, and fixed instruments 1806b and 1806c for displaying a speed meter, a fuel gauge, a revolution per minute (RPM) gauge and the like. The steering wheel 1808 may include buttons 1808a and 1808b for controlling the head unit 1804 and various media devices included in the vehicle 1800.

An on-board diagnostics (OBD) 1811 may be connected to the vehicle 1800 by wire or wirelessly, and may communicate with at least one of the vehicle 1800 and the head unit 1804 via an intra-vehicle bus (IVB) 1810. The electronic device 101 may directly communicate with at least one of the vehicle 1800 and the head unit 1804, and/or may communicate with at least one of the vehicle 1800 and the head unit 1804 by way of the OBD 1811. Further, communication between the OBD 1811 and the electronic device 101 is also possible.

As such, the electronic device 101 may communicate with at least one of the vehicle 1800 and the head unit 1804. Therefore, the electronic device 101 may transmit, to the vehicle 1800 or the head unit 1804, configuration information that is identified differently for each level, in response to the signal broadcast by the vehicle 1800 or the head unit 1804.

Figure 19:
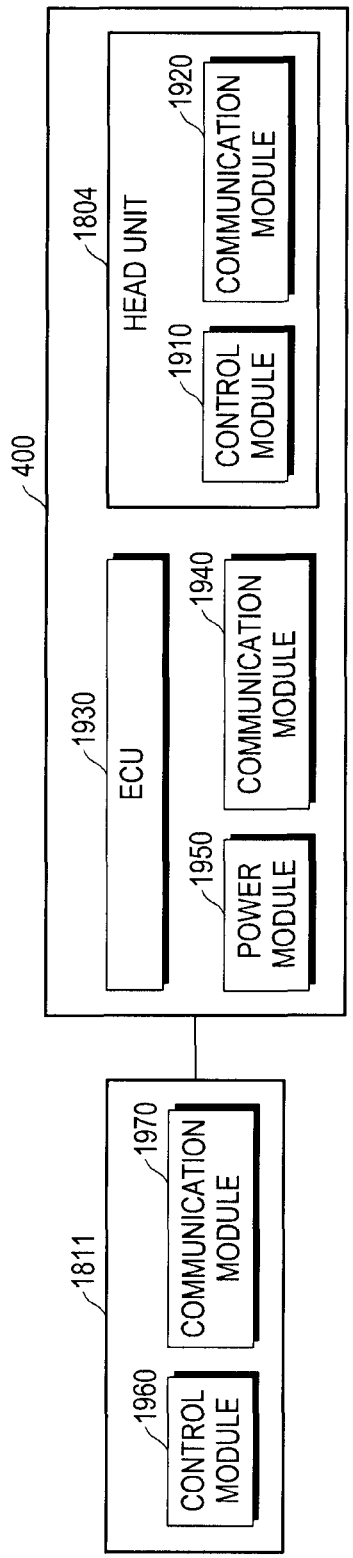
FIG. 19 is a block diagram of a media device according to various embodiments of the present disclosure.

FIG. 19 is a block diagram of a media device according to various embodiments of the present disclosure.

In FIG. 19, the vehicle 1800 described in FIG. 18 will be assumed as an example of the media device 400.

In various embodiments of the present disclosure, the media device 400 may include the head unit 1804, an electronic control unit (ECU) 1930, a communication module 1940, and a power module 1950. Further, the media device 400 and the OBD 1811 may be connected to each other by wire or wirelessly.

A sub-module for controlling the head unit 1804, the ECU 1930, the OBD 1811 and the media device 400 may perform at least a portion of the function of the first sub-module 440 and the second sub-module 450 described in FIG. 4B.

In one embodiment, the head unit 1804 may include a control module 1910 and a communication module 1920. The control module 1910 may control the head unit 1804, and may perform at least a portion of the function of the processor 420 described in FIG. 4A. The communication module 1920 may perform at least a portion of the function of the communication module 410 described in FIG. 4A, and may communicate with an external electronic device directly or by way of at least one of the communication module 1940 and a communication module (e.g., a communication module 1970) included in another sub-module.

The ECU 1930 may control the engine, automatic transmission and antilock braking system (ABS) of the vehicle 1800, and may perform at least a portion of the function of the processor 420 described in FIG. 4A. Further, the communication module 1940 may perform at least a portion of the function of the communication module 410 described in FIG. 4A. The power module 1950 may supply the power to the media device 400.

In one embodiment, the OBD 1811 may include a control module 1960 and a communication module 1970. The control module 1960 may control the OBD 1811, and may perform at least a portion of the function of the processor 420 described in FIG. 4A. The communication module 1970 may perform at least a portion of the function of the communication module 410 described in FIG. 4A, and may communicate with an external electronic device directly or by way of at least one of the communication module 1940 and a communication module (e.g., the communication module 1920) included in another sub-module.

In various embodiments of the present disclosure, the head unit 1804, the ECU 1930 and the OBD 1811 may broadcast a signal including information related to the media device 400. As described above, the head unit 1804 and the OBD 1811 may broadcast the signal to the outside directly or by way of at least one of the communication module 1940 and a communication module included in another sub-module.

The signal may include information about the sub-module (e.g., head unit 1804, ECU 1930 and OBD 1811) to which the signal is transmitted. Further, the signals broadcasted by the head unit 1804, the ECU 1930 and the OBD 1811 may have different signal characteristics. Through this, the electronic device 101 may identify the sub-module that has transmitted the received signal.

The electronic device 101 may identify a level of at least one of the at least one configuration information depending on the identified sub-module, and transmit configuration information corresponding to the identified level to the media device 400.

For example, it will be assumed that a first sub-module (e.g., the ECU 1930, the OBD 1811 and the like) connected to the regular power of the media device 400 broadcasts a first signal, and a second sub-module (e.g., the head unit 1804, a telemetric unit and the like), which operates after the media device 400 is started, broadcasts a second signal. Further, it will be assumed that in consideration of the security characteristics, the first sub-module corresponds to the first level and the second sub-module corresponds to the second level.

In this case, the electronic device 101 may determine that the sub-module that has transmitted the first signal is the first sub-module, based on the first signal. Upon determining that the sub-module that has transmitted the first signal is the first sub-module, the electronic device 101 may identify first configuration information corresponding to the first level among the at least one configuration information, and transmit the first configuration information to the media device 400.

Further, the electronic device 101 may determine that the sub-module that has transmitted the second signal is the second sub-module, based on the second signal. Upon determining that the sub-module that has transmitted the second signal is the second sub-module, the electronic device 101 may identify second configuration information corresponding to the second level among the at least one configuration information. Further, if the user's approval is obtained, the electronic device 101 may transmit the second configuration information to the media device 400.

Figure 20:
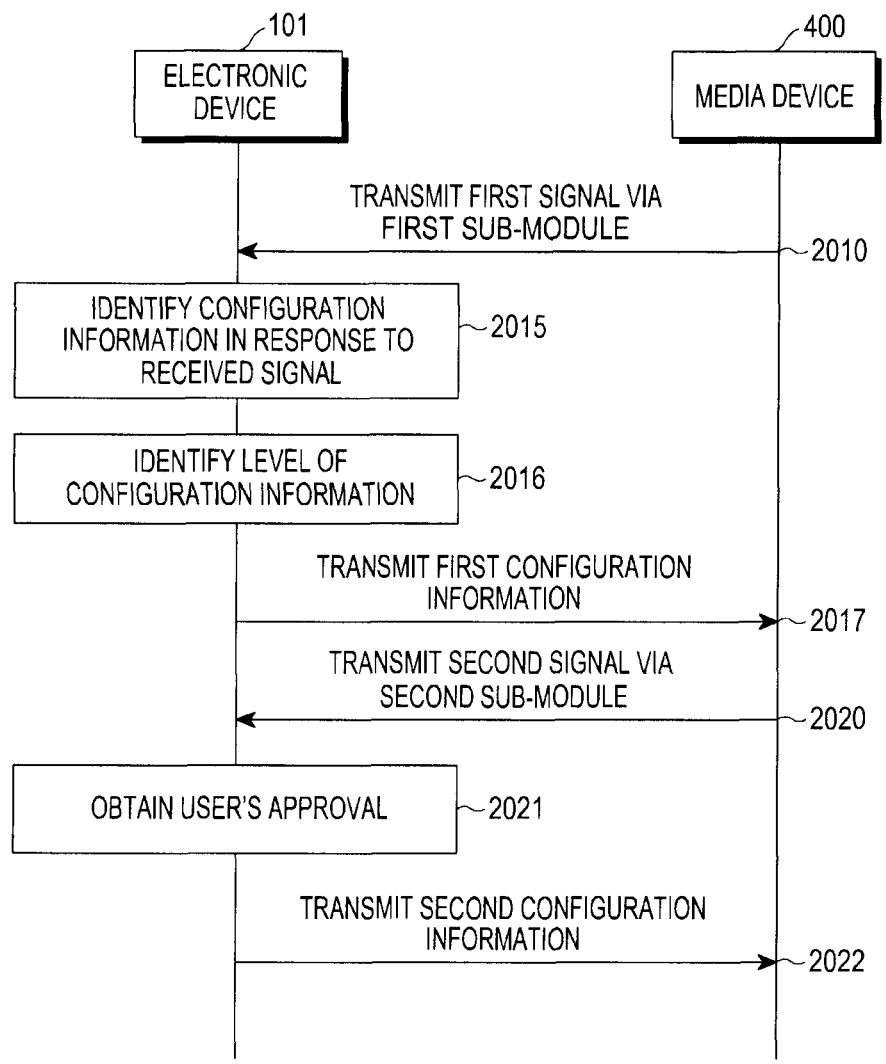
FIG. 20 is a flowchart of a configuration information transmission method by an electronic device according to various embodiments of the present disclosure.

FIG. 20 is a flowchart of a configuration information transmission method by an electronic device according to various embodiments of the present disclosure.

It will be assumed in FIG. 20 that a first sub-module corresponds to a first level and a second sub-module corresponds to a second level.

In operation 2010, the media device 400 may transmit a first signal including information related to the media device 400 via a first sub-module. The electronic device 101 may identify the first sub-module that that transmitted the first signal, based on the first signal.

In operation 2015, the electronic device 101 may identify at least one configuration information to be used for configuration of the media device 400 in response to the first signal.

In operation 2016, the electronic device 101 may identify a level of at least one of the at least one configuration information based on the identified sub-module. In this case, the electronic device 101 may identify first configuration information corresponding to the first level among the at least one configuration information.

In operation 2017, the electronic device 101 may transmit the first configuration information to the media device 400.

In operation 2020, the media device 400 may transmit a second signal including information related to the media device 400 via a second sub-module. The electronic device 101 may identify the second sub-module that has transmitted the second signal, based on the second signal.

In operation 2021, the electronic device 101 may identify second configuration information corresponding to the second level among the at least one configuration information. If the second configuration information is identified, the electronic device 101 may obtain the user's approval, for transmission of the second configuration information.

In operation 2022, the electronic device 101 may transmit the second configuration information to the media device 400.

Figure 21:
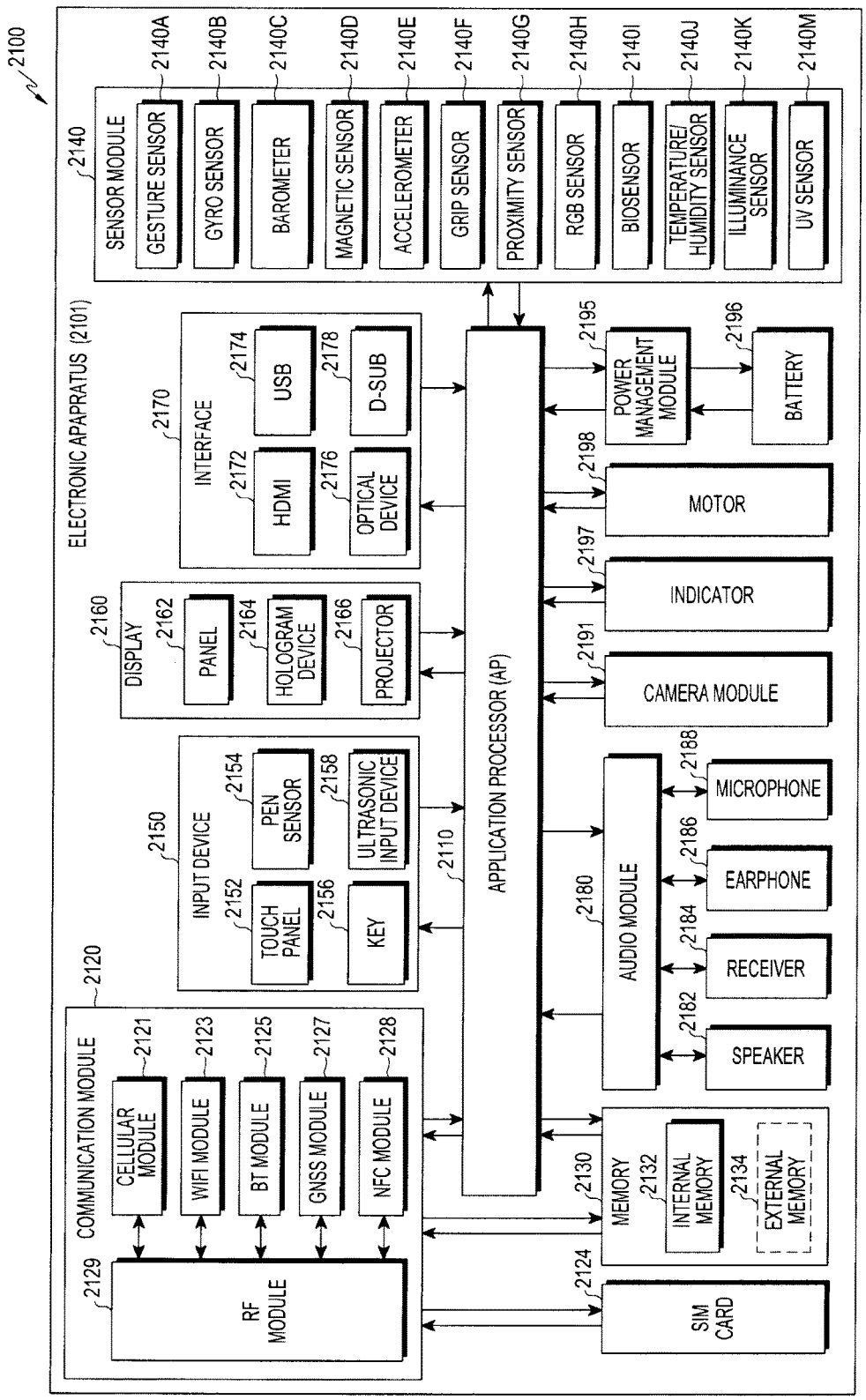
FIG. 21 is a block diagram of an electronic device according to various embodiments of the present disclosure.

FIG. 21 is a block diagram 2100 of an electronic device 2101 according to various embodiments of the present disclosure. The electronic device 2101 may include, for example, the whole or a part of the electronic device 101 shown in FIG. 1. The electronic device 2101 may include at least one or more processor (e.g., AP) 2110, a communication module 2120, a subscriber identification module (SIM) 2124, a memory 2130, a sensor module 2140, an input device 2150, a display 2160, an interface 2170, an audio module 2180, a camera module 2191, a power management module 2195, a battery 2196, an indicator 2197, and a motor 2198.

The processor 2110 may control a plurality of hardware or software components connected to the processor 2110 by running, for example, the operating system or application program, and may process and calculate various data. The processor 2110 may be implemented as, for example, a system on chip (SoC). In one embodiment, the processor 2110 may further include a graphic processing unit (GPU) and/or an image signal processor. The processor 2110 may include at least some (e.g., a cellular module 2121) of the components shown in FIG. 21. The processor 2110 may load, on a volatile memory, a command or data received from at least one of other components (e.g., non-volatile memory) and process the loaded data, and may store a variety of data in a non-volatile memory.

The communication module 2120 may have a structure which is the same as or similar to that of the communication interface 170 in FIG. 1. The communication module 2120 may include, for example, the cellular module 2121, a WiFi module 2123, a Bluetooth (BT) module 2125, a GNSS module (e.g., GPS module, Glonass module, Beidou module, or Galileo module) 2127, an NFC module 2128, and a radio frequency (RF) module 2129.

The cellular module 2121 may provide, for example, a voice call service, a video call service, a messaging service or an Internet service over a communication network. In one embodiment, the cellular module 2121 may identify and authenticate the electronic device 2101 within the communication network using the subscriber identification module (e.g., the SIM card) 2124. In one embodiment, the cellular module 2121 may perform some of the functions that can be provided by the processor 2110. In one embodiment, the cellular module 2121 may include a communication processor (CP).

Each of the WiFi module 2123, the BT module 2125, the GNSS module 2127 or the NFC module 2128 may include, for example, a processor for processing the data transmitted or received through the corresponding module. In some embodiments, at least some (e.g., two or more) of the cellular module 2121, WiFi module 2123, the BT module 2125, the GNSS module 2127 or the NFC module 2128 may be included in one integrated chip (IC) or IC package.

The RF module 2129 may, for example, transmit and receive communication signals (e.g., RF signals). The RF module 2129 may include, for example, a transceiver, a power amplifier module (PAM), a frequency filter, a low noise amplifier (LNA), or an antenna. In another embodiment, of the cellular module 2121, the WiFi module 2123, the BT module 2125, the GNSS module 2127 or the NFC module 2128 may transmit and receive RF signals through a separate RF module.

The subscriber identification module 2124 may include, for example, a card with a subscriber identification module and/or an embedded SIM. The subscriber identification module 2124 may include unique identification information (e.g., integrated circuit card identifier (ICCID)) or subscriber information (e.g., international mobile subscriber identity (IMSI)).

The memory 2130 (e.g., the memory 130) may include, for example, an internal memory 2132 or an external memory 2134. The internal memory 2132 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD).

The external memory 2134 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 2134 may be functionally and/or physically connected to the electronic device 2101 through various interfaces.

The sensor module 2140 may, for example, measure the physical quantity or detect the operating status of the electronic device 2101, and convert the measured or detected information into an electrical signal. The sensor module 2140 may include at least one of, for example, a gesture sensor 2140A, a gyro sensor 2140B, a barometer 2140C, a magnetic sensor 2140D, an accelerometer 2140E, a grip sensor 2140F, a proximity sensor 2140G, a color sensor (e.g., red, green, blue (RGB) sensor) 2140H, a biosensor 2140I, a temperature/humidity sensor 2140J, an illuminance sensor 2140K, or a ultra violet (UV) sensor 2140M. Additionally or alternatively, the sensor module 2140 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 2140 may further include a control circuit for controlling at least one or more sensors belonging thereto. In some embodiments, the electronic device 2101 may further include a processor configured to control the sensor module 2140, separately or as a part of the processor 2110, and may control the sensor module 2140 while the processor 2110 is in a sleep state.

The input device 2150 may include, for example, a touch panel 2152, a (digital) pen sensor 2154, a key 2156, or an ultrasonic input device 2158. The touch panel 2152 may use at least one of, for example, capacitive, resistive, infrared or ultrasonic scheme. Further, the touch panel 2152 may further include a control circuit. The touch panel 2152 may further include a tactile layer, to provide a tactile or haptic feedback to the user.

The (digital) pen sensor 2154, for example, may be a part of the touch panel 2152, or may include a separate recognition sheet. The key 2156 may include, for example, a physical button, an optical key or a keypad. The ultrasonic input device 2158 may detect sound waves generated in an input tool through a microphone (e.g., a microphone 2188) to identify data corresponding to the detected sound waves.

The display 2160 (e.g., the display 160) may include a panel 2162, a hologram device 2164, or a projector 2166. The panel 2162 may include a structure which is the same as or similar to that of the display 160 in FIG. 1. The panel 2162 may be implemented to be, for example, flexible, transparent or wearable. The panel 2162, together with the touch panel 2152, may be implemented as one module. The hologram device 2164 may show stereoscopic images in the air using the interference of the light. The projector 2166 may display images by projecting the light on the screen. The screen may be disposed on the inside or outside of, for example, the electronic device 2101. In one embodiment, the display 2160 may further include a control circuit for controlling the panel 2162, the hologram device 2164, or the projector 2166.

The interface 2170 may include, for example, an HDMI 2172, a USB 2174, an optical interface 2176 or D-subminiature (D-sub) 2178. The interface 2170 may be included in, for example, the communication interface 170 shown in FIG. 1. Additionally or alternatively, the interface 2170 may include, for example, a mobile high-definition link (MHL) interface, a secure digital (SD) card/multi-media card (MMC) interface or an infrared data association (IrDA) interface.

The audio module 2180, for example, may convert the sound and electrical signals bi-directionally. At least some components of the audio module 2180 may be included in, for example, the I/O interface 150 shown in FIG. 1. The audio module 2180 may process the sound information that is received or output through, for example, a speaker 2182, a receiver 2184, an earphone 2186 or the microphone 2188.

The camera module 2191 is, for example, a device capable of capturing still images and videos. In one embodiment, the camera module 2191 may include one or more image sensors (e.g., a front image sensor or a rear image sensor), a lens, an image signal processor (ISP), or a flash (e.g., an LED or xenon lamp).

The power management module 2195 may, for example, manage the power of the electronic device 2101. In one embodiment, the power management module 2195 may include, for example, a power management integrated circuit (PMIC), a charger integrated circuit (IC), or a battery or fuel gauge. The PMIC may have a wired and/or wireless charging scheme. The wireless charging scheme may include, for example, a magnetic resonance scheme, a magnetic induction scheme, or an electromagnetic scheme, and the power management module 2195 may further include additional circuits (e.g., a coil loop, a resonance circuit, a rectifier or the like) for wireless charging. The battery or fuel gauge may, for example, measure the remaining capacity, charging voltage, charging current or temperature of the battery 2196. The battery 2196 may include, for example, a rechargeable battery and/or a solar battery.

The indicator 2197 may indicate specific status (e.g., boot status, message status, charging status or the like) of the electronic device 2101 or a part (e.g. the processor 2110) thereof. The motor 2198 may convert an electrical signal into mechanical vibrations, thereby generating a vibration or haptic effect. Although not shown, the electronic device 2101 may include a processing device (e.g., GPU) for mobile TV support. The processing device for mobile TV support may process media data that is based on the standards such as, for example, digital multimedia broadcasting (DMB), digital video broadcasting (DVB) or mediaFLO™.

Each of above-described components of the electronic device 2101 may be configured with one or more components, names of which may vary depending on the type of the electronic device 2101. In various embodiments, the electronic device 2101 may include at least one of the above-described components, some of which may be omitted, or may further include additional other components. Further, some of the components of the electronic device 2101 according to various embodiments of the present disclosure may be configured as one entity by being combined, thereby performing the previous functions of the components in the same manner.

The term 'module' as used herein may refer to a unit that includes, for example, one of hardware, software or firmware or a combination thereof. The term 'module' may be interchangeably used with terms such as, for example, unit, logic, logical block, component, or circuit. The module may be the minimum unit of an integrally constructed part or a part thereof. The module may be the minimum unit for performing one or more functions, or a part thereof. The module may be implemented mechanically or electronically. For example, the module may include at least one of an application-specific integrated circuit (ASIC) chip, field-programmable gate arrays (FPGAs), or a programmable-logic device, which are known or will be developed in the future, and which perform certain operations.

At least a part of the device (e.g., modules or functions thereof) or method (e.g., operations) according to various embodiments of the present disclosure may be implemented by a command that is stored in computer-readable storage media in the form of, for example, a programming module. If the command is executed by one or more processors (e.g., the processor 120), the one or more processors may perform a function corresponding to the command. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) and a flash memory). The program command may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic way. Further, some operations may be performed in a different order or omitted, or other operations may be added.

As is apparent from the foregoing description, in various embodiments of the present disclosure, the electronic device may identify at least one configuration information to be used for configuration of a media device, identify a level of at least one of the at least one configuration information, and determine whether transmission is permitted based on the identified level, to transmit the at least one configuration information. As such, by differently determining whether transmission of configuration information is possible for each level, the electronic device may transmit the configuration information differently for each level. Further, the user may make it possible for the configuration information to be selectively delivered to the media device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method in an electronic device, comprising:
receiving, from a media device, at least a first and a second signal, the first signal including first information related to a media device and the second signal including second information related to the media device;
wherein the first information of the first signal indicates a state of the media device, and the second information of the second signal indicates an identifier of the media device, and
wherein the first signal and the second signal are different from one another with respect to communication modes including at least one of a coverage range of each signal a frequency band of each signal, a permeability of each signal a bandwidth of each signal a packet size of each signal a modulation of each signal and an encryption of each signal;
in response to receiving the first and second signals, identifying target configuration information from among a plurality of pieces of configuration information usable to set a configuration of the media device which is in an initial state, wherein each piece of the plurality of pieces of configuration information includes a level, and wherein at least a part of the plurality of pieces of configuration information include different security levels;
identifying, among the different security levels, a security level of the target configuration information, wherein the different security levels include a first security level, a second security level and a third security level, wherein the first security level includes no authorization requirement for transmission of the target configuration information, wherein the second security level includes authorization based on a prompt requesting confirmation that the transmission is permitted, and wherein the third security level is a highest security level among the different security levels, and includes authorization based on a preset password permitting the transmission;
determining whether the target configuration information is transmittable to the media device based on the identified security level of the target configuration information; and
in response to determining that the target configuration information is transmittable, transmitting the target configuration information to the media device,
wherein when the identified security level is the third security level and the preset password is received, the target configuration information is transmitted to the media device.

2. The method of claim 1, wherein the different security levels of each piece of the plurality of pieces of configuration information is identified based on the first and second information related to the media device.

3. The method of claim 1, where the communication modes include at least one of a radio frequency (RF) signal, a communication mode based on an audio signal, a communication mode based on a visual signal, and a communication mode based on smell.

4. The method of claim 1, further comprising determining whether each of the first signal and second signals is valid.

5. The method of claim 4, wherein identifying the security level of the target configuration information is performed based on whether at least one of the first and second signals is valid.

6. The method of claim 1, wherein identifying the security level of the target configuration information is performed based on characteristics of the first and second signals.

7. The method of claim 6, wherein the characteristics of the first and second signals comprise at least one of signal strength, signal quality, a signal-to-noise ratio (SNR), an error rate, a direction, frequency characteristics, modulation characteristics, a channel, a band and a bandwidth.

8. The method of claim 1, wherein the target configuration information is transmitted to the media device through a personal server connected to the electronic device and the media device.

9. The method of claim 8, wherein the target configuration information is used to set a first part of the configuration of the media device, and the personal server transmits further configuration information provided by another electronic device connected via the personal server to the media device, the further configuration information being used to set a second part of the configuration of the media device.

10. The method of claim 1, wherein transmitting the target configuration information comprises selecting a communication mode for transmission based on the identified security level of the target configuration information, and transmitting the target configuration information to the media device through the selected communication mode.

11. An electronic device comprising:
a communication circuit;
a processor operably coupled to the communication circuit; and
a memory operably coupled to the processor;
wherein the memory comprises instructions executable by the processor to:
receive, from a media device via the communication circuit, at least a first and a second a signal, the first signal including first information related to the media device, and the second signal including second information related to the media device,
wherein the first information of the first signal indicates a state of the media device, and the second information of the second signal indicates an identifier of the media device,
wherein the first signal and the second signal are different from one another with respect to communication modes including at least one of a coverage range of each signal a frequency band of each signal, a permeability of each signal a bandwidth of each signal a packet size of each signal a modulation of each signal and an encryption of each signal: and
in response to receiving the first and second signals, identify target configuration information from among a plurality of pieces of configuration information usable to configure the media device which is in an initial state, wherein each piece of the plurality of pieces of configuration information includes a security level, and wherein at least part of the plurality of pieces of configuration information have different security levels,
identify, among the different security levels, a security level of the target configuration information, wherein the different security levels include a first security level, a second security level and a third security level,
wherein the first security level includes no authorization requirement for transmission of the target configuration information,
wherein the second security level includes authorization based on a prompt requesting confirmation that the transmission is permitted, and
wherein the third security level is a highest security level among the different security levels, and includes authorization based on a preset password permitting the transmission,
determine whether the target configuration information is of a type permitted to be transmitted to the media device, based on the identified security level of the target configuration information, and
in response to determining that the target configuration information is transmittable, transmit the target configuration information to the media device,
wherein when the identified security level is the third security level and the preset password is received, the target configuration information is transmitted to the media device.

12. A method for operating an electronic device, the method comprising:
broadcasting to an external mobile device a first signal, a second signal and a third signal, each including information related to the electronic device which is in an initial state, through a first communication mode, a second communication mode and a third communication mode, respectively, to cause the external mobile device to execute a function for configuring the electronic device;
wherein a first information of the first signal indicates a state of the media device, and a second information of the second signal indicates an identifier of the media device, and
wherein the first signal and the second signal are different from one another with respect to communication modes including at least one of a coverage range of each signal a frequency band of each signal, a permeability of each signal a bandwidth of each signal a packet size of each signal a modulation of each signal and an encryption of each signal;
receiving configuration information, through at least one of the first to third communication modes, which has been determined to be transmittable in a manner based on a security level among different security levels, from a mobile device that has received at least one of the first signal, the second signal and the third signal, wherein the different security levels include a first security level, a second security level and a third security level; and
setting a configuration based at least a part on the configuration information, wherein receiving configuration information comprises at least one of receiving first configuration information designated at the first security level from the external mobile device through the first communication mode, receiving second configuration information designated at the second security level from the external mobile device through the second communication mode, and receiving third configuration information designated at the third security level from the external mobile device through the third communication mode,
wherein the first security level includes no authorization requirement for transmission of the configuration information,
wherein the second security level includes authorization based on a prompt requesting confirmation that the transmission is permitted, and
wherein the third security level is a highest security level among the different security levels, and includes authorization based on a preset password permitting the transmission,
wherein when the third security level is designated and the preset password is received at the external mobile device, the configuration information is transmitted from the external mobile device.

13. The method of claim 12, wherein the information related to the electronic device includes at least one of information about a configuration state of the electronic device, information about an operating state of the electronic device and device information of the electronic device.

14. The method of claim 12, wherein the first signal includes state information of the electronic device, and the second signal includes information for identifying the electronic device.

15. The method of claim 12, further comprising:
making a connection to a personal server connected to the electronic device and the external mobile device based on the configuration information, and
receiving configuration information of another electronic device connected to the personal server, from the personal server.

* * * * *